United States Patent
Asman et al.

(10) Patent No.: US 10,242,035 B1
(45) Date of Patent: Mar. 26, 2019

(54) METHOD AND SYSTEM FOR IMAGE SEARCHING

(71) Applicant: Pond5 Inc., New York, NY (US)

(72) Inventors: Carl Asman, New York, NY (US); Jonas Persson, New York, NY (US); Marcus Engene, New York, NY (US)

(73) Assignee: POND5, INC., New York, NY (US)

( * ) Notice: Subject to any disclaimer, the term of this patent is extended or adjusted under 35 U.S.C. 154(b) by 0 days.

(21) Appl. No.: 16/133,754

(22) Filed: Sep. 18, 2018

Related U.S. Application Data

(60) Provisional application No. 62/651,304, filed on Apr. 2, 2018.

(51) Int. Cl.
*G06K 9/62* (2006.01)
*G06F 17/30* (2006.01)
(Continued)

(52) U.S. Cl.
CPC .... *G06F 17/30271* (2013.01); *G06F 17/3028* (2013.01); *G06K 9/4652* (2013.01); *G06K 9/6215* (2013.01); *G06K 9/6223* (2013.01); *G06N 3/08* (2013.01); *G06T 3/40* (2013.01); *G06T 5/005* (2013.01); *G06T 3/20* (2013.01);
(Continued)

(58) Field of Classification Search
CPC . G06T 2207/10004; G06T 2207/20081; G06T 2207/10016; G06T 2207/20084; G06T 2207/20076; G06T 2207/20192; G06T 3/40; G06T 3/20; G06T 3/60; G06T 5/005; G06K 9/6223; G06K 9/4652; G06K 9/6215; G06F 17/30271; G06F 17/3028; H04N 5/232; G06N 3/08
See application file for complete search history.

(56) References Cited

U.S. PATENT DOCUMENTS 9,904,866 B1 * 2/2018 Noble .................. G06K 9/3241
2010/0104217 A1 * 4/2010 Tsurumi ............. G06K 9/00335
382/284

(Continued)

OTHER PUBLICATIONS

Reverse image search, Webpage, https://support.google.com/websearch/answer/1325808?p=searchbyimag..., pp. 1-3, 2015. (Year: 2015).*

*Primary Examiner* — Amara Abdi
(74) *Attorney, Agent, or Firm* — John Maldjian; Maldjian Law Group LLC

(57) ABSTRACT

A real-time reverse image searching for images analogous to a frame having patterns, performed using a processor connected to a network and having access to digital libraries warehousing a plurality of vectors and respective images/videos associated with each of the plurality of vectors, including: calculating representations for each of the patterns in the frame to form a vector, the representations corresponding to dimensions of the vector; reducing a size of the vector by reducing a number of the dimensions to one of about 8% and a maximum trade-off between the quality of the image and the size of vector; detecting, in the digital libraries, of the plurality of vectors that are most similar to the vector of the frame; and offering, in real-time via the network, images/videos associated with the selected of the plurality of vectors, wherein a number of the offered images and videos is pre-determined.

20 Claims, 20 Drawing Sheets

(51) Int. Cl.
  *G06N 3/08*      (2006.01)
  *G06K 9/46*      (2006.01)
  *G06T 3/40*      (2006.01)
  *G06T 5/00*      (2006.01)
  *H04N 5/232*     (2006.01)
  *G06T 3/60*      (2006.01)
  *G06T 3/20*      (2006.01)

(52) U.S. Cl.
  CPC ...... *G06T 3/60* (2013.01); *G06T 2207/10004* (2013.01); *G06T 2207/10016* (2013.01); *G06T 2207/20076* (2013.01); *G06T 2207/20081* (2013.01); *G06T 2207/20084* (2013.01); *G06T 2207/20192* (2013.01); *H04N 5/232* (2013.01)

(56) References Cited

U.S. PATENT DOCUMENTS

| | | | | |
|---|---|---|---|---|
| 2014/0333775 | A1* | 11/2014 | Naikal | H04N 7/181 |
| | | | | 348/159 |
| 2014/0365463 | A1* | 12/2014 | Tusk | G06F 17/30247 |
| | | | | 707/711 |
| 2016/0378790 | A1* | 12/2016 | Besehanic | G06K 9/18 |
| | | | | 707/706 |
| 2018/0025215 | A1* | 1/2018 | Yousef | G06F 17/30247 |
| | | | | 382/118 |
| 2018/0204094 | A1* | 7/2018 | Ding | G06K 9/00 |

\* cited by examiner

Cluster the vectors into clusters (increase performance)

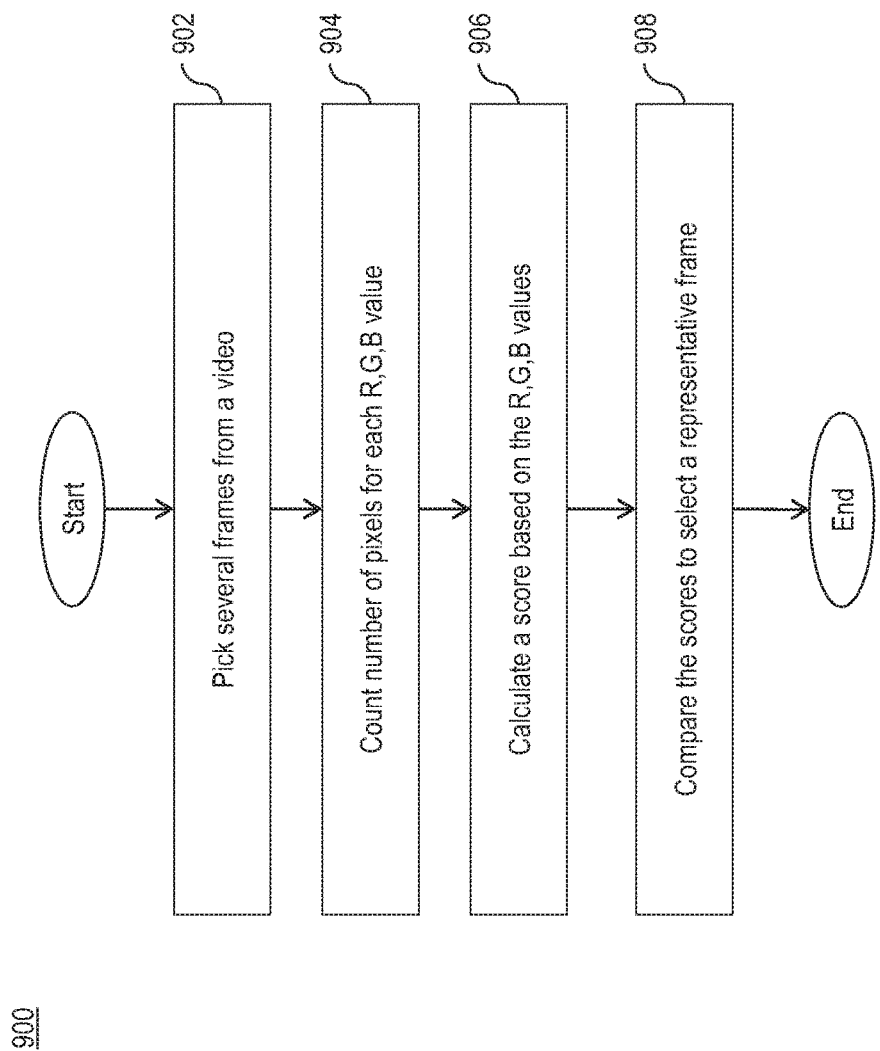

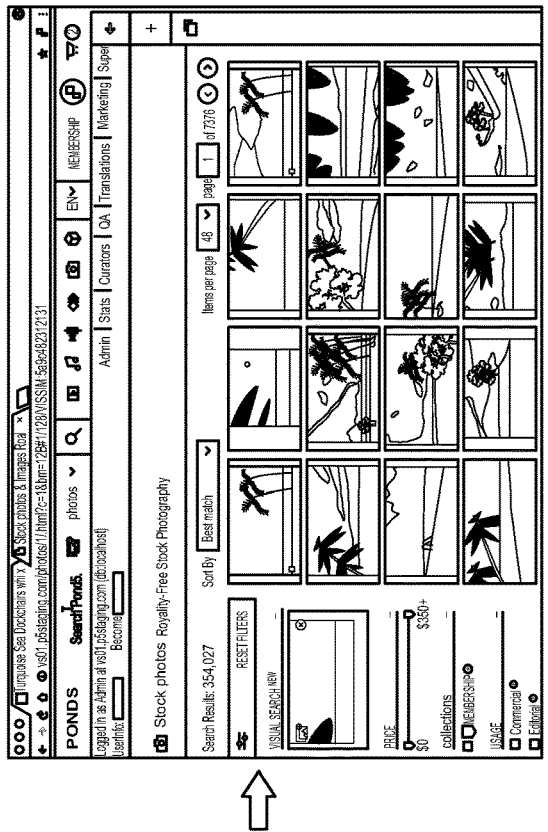
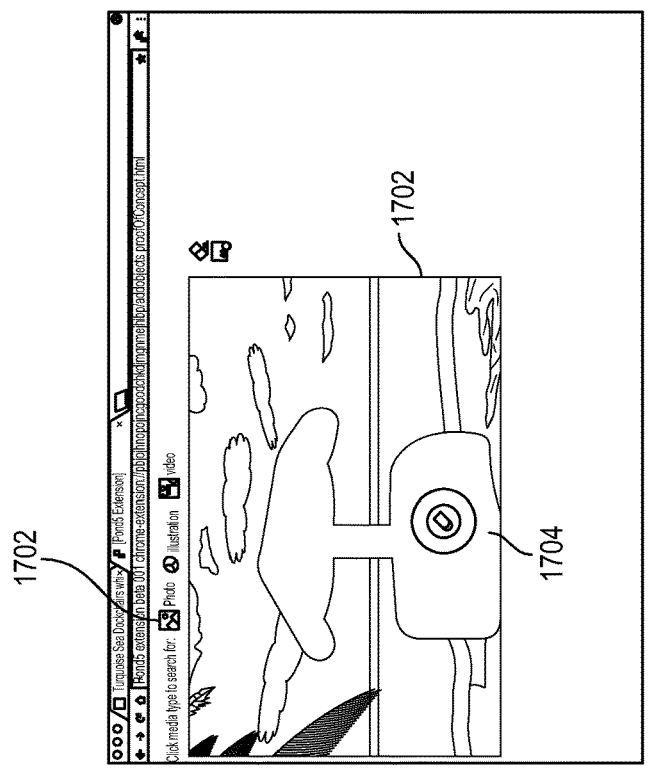
FIG. 17B
FIG. 17A

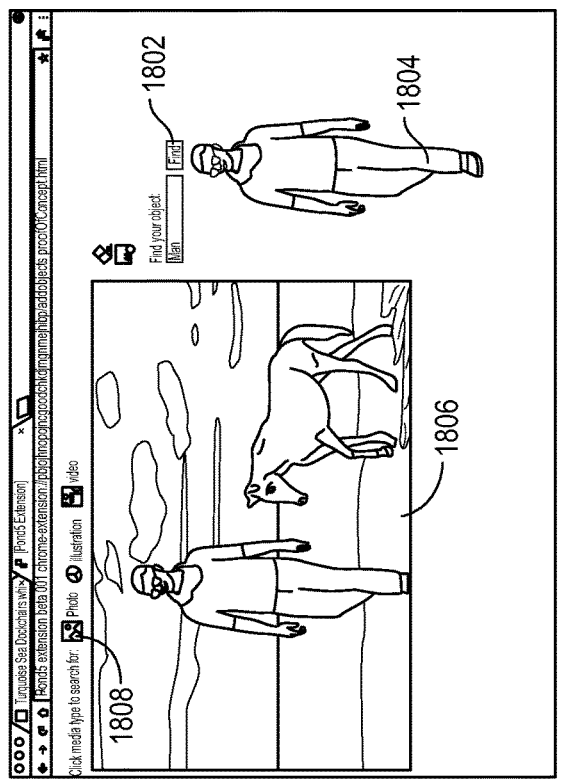
FIG. 18A
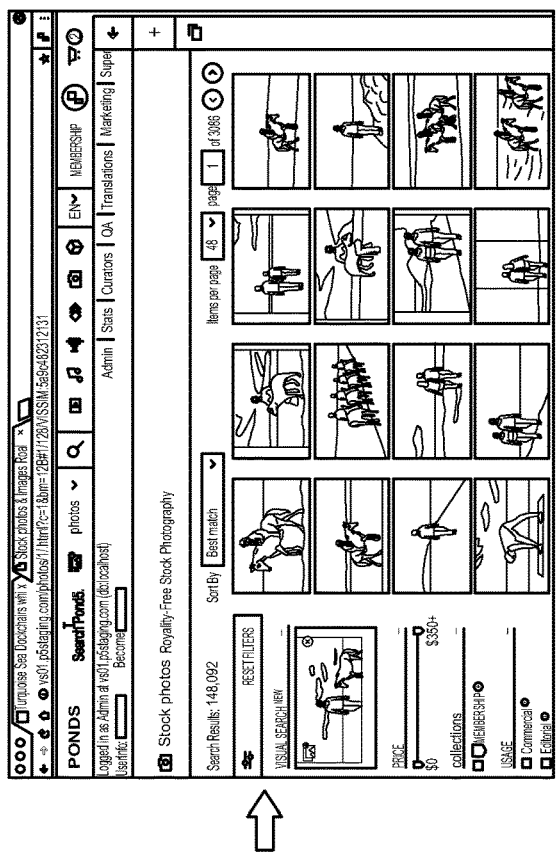
FIG. 18B

METHOD AND SYSTEM FOR IMAGE SEARCHING

CROSS REFERENCE TO RELATED APPLICATIONS

This application claims the benefit of U.S. Provisional Application Ser. No. 62/651,304, filed Apr. 2, 2018, entitled "METHOD AND SYSTEM FOR IMAGE SEARCHING," which is incorporated herein by reference in its entirety

FIELD OF INVENTION

The system of the invention generally relates to reverse image searching, and in particular to forming vectors using a minimal number of dimensions of objects in representative frames of search string images and further, performing the reverse image searching within a subspace of clusters of vectors representative of images and videos in digital libraries or databases of images and videos.

BACKGROUND OF INVENTION

Images and videos are often searched on the Internet by using computer programs called "search engines". The search engines require input of some keywords describing the image to find results relate to the description. For example, in response to receipt of a keyword, such as, "apple", a search engine may return images of a fruit, apple, as well as anything else it may recognize as apple, such as a logo of a company that goes by the name "Apple".

To search for images, some search engines use advanced techniques. One such technique is "reverse image search". Instead of keywords, reverse image search accepts an image upload to use for searching for similar images. For example, instead of typing the word "apple" an image of the fruit "apple" is uploaded so as to find additional images of the fruit "apple".

These techniques have been enhanced by recent developments in image recognition technology. The enhancements recognize shapes, colors, etc. of still images or moving images, ascertain which elements are of primary focus and to return relevant "visually similar" results from digital libraries of images and videos or databases. However, the existing techniques are limited to the keywords and image searching. Accordingly, it is desirable to provide novel techniques that further enhance and improve reverse image searching.

SUMMARY OF INVENTION

Provided is a real-time reverse image search for one or more images analogous to a representative frame having one or more patterns, the searching is performed using a processor connected to a network and having access to at least one digital library warehousing a plurality of vectors and respective images and videos associated with each of the plurality of vectors, including: on a computing device connected to the network and having at least one video camera, capturing in real time, by training the at least one video camera on an object of interest and/or uploading, one or more images; identifying at least one of the captured one or more images as the representative frame for use as input in the reverse search.

On the processor: calculating one or more mathematical representations for each of the one or more patterns in the representative frame to form a representative vector, the one or more mathematical representations corresponding to dimensions of the vector; reducing a size of the vector by reducing a number of the dimensions to one of about 8% and a maximum trade-off between the quality of the image and the size of vector; detecting, in the at least one digital library, one or more of the plurality of vectors that are most similar to the vector of the representative frame; and offering, in real-time via the network, images and videos associated with the selected one or more of the plurality of vectors, wherein a number of the offered images and videos is pre-determined.

In accordance with the reverse image searching system of the invention, a motion image or a video is received as a search input. A representative frame, or multiple representative frames within the search input are determined with algorithmic weighting being applied to each representative frame. Also a search focus is determined based on patterns included in the representative frames. Thereafter, a reverse search is performed to determine images having similar patterns, and the results are displayed on the user device. The search is performed in digital libraries of images and videos or databases.

To perform the search, embodiments of the inventive system forms search vectors describing objects or patterns in the representative frame. That is the frame that is representative of a set or a sequence of images, or a sequence frames in a video stream. Then, the sizes of the search vectors are reduced, e.g., by using convolutional neural network techniques. The calculated, reduced search vectors are then used to reverse search the clustered vectors corresponding to images or videos in the digital libraries of images and videos that are similar to the representative frame.

The clustered vectors corresponding to the images or videos in the digital libraries can be formed in the same manner as the search vectors that is by extracting the vectors from the Convolutional Neural Network (CNN) and then reducing the number of dimensions down to about 40 dimensions. The inventors discovered through experiments that the use of CNN to reduce to 40 dimensions is preferred over the Principal Component Analysis (PCA) because with PCA reduction of dimensions to below 96 dimensions resulted in significant loss of quality of the representation.

The vectors in the digital libraries are grouped into clusters based on the nearness or similarity of the vectors to each other. So, for example, vectors representing images of cars are grouped together and vectors representing images of truck are grouped together. Subsequently, these clusters enable enhanced image searches.

Further, to avoid searching through the vectors corresponding to all images or videos in each digital library, the vectors are clustered to create a searchable subspace. When searching, there may be vectors that are far away from a center of their cluster, and in fact have more in common with vectors in a nearby clusters than the vectors near the center. Accordingly the system of the invention re-clusters the vectors to create a different, higher number of clusters, which creates different centers for the new clusters.

In one embodiment, the system of the invention uses a processor to receive one or more still images and images forming a pre-recorded or live video. The processor can select the representative frame from the still images and/or the video and generate search vectors corresponding of the images in the respective representative frame. The generated search vectors may then be compared with other previously calculated and clustered vectors corresponding to other images and stored in one or more digital libraries or databases. This comparison, also referred to as a search, may return vectors representative of images that are visually similar to the selected representative frame.

In another embodiment of the system of the invention, before the search vector is generated, the representative frame may be edited. First the representative frame is analyzed to determine or recognize objects or patterns. Then, the recognized objects or patterns can be deleted and additional, previously absent, objects or patterns can be added to the representative image. After the edits are completed, vectors corresponding to the representative frames are generated.

As stated, in accordance with the system of the invention, still and motion images or video can be used to select the representative frame so as to form the corresponding vectors. This allows performance of reverse image search in real time using a live video stream, e.g., captured directly from a video camera. Additionally, the editing ability provided by the system of the invention enables enhancement and correction of portions to the images that are out of focus.

The system of the invention includes identifying, from at least one of one or more images, a representative frame and one or more patterns in the representative frame; calculating a vector corresponding to each of the one or more patterns of the representative frames, wherein the patterns in the representative frame are represented by a mathematical representation, e.g., a vector having a reduced size.

These and other advantages will be apparent from the discussion of the below described embodiments. The preceding is a simplified summary to provide an understanding of some embodiments of the system of the invention. This summary is neither an extensive nor exhaustive overview of the disclosure of the system of the invention and its various embodiments. The summary presents selected concepts of the embodiments of the system of the invention in a simplified form as an introduction to the more detailed description below. As will be appreciated, other embodiments of this disclosure are possible utilizing, alone or in combination, one or more of the features set forth above or described in detail below.

BRIEF DESCRIPTION OF DRAWINGS

The above and still further features and advantages of the system of the invention will become apparent upon consideration of the following detailed description of embodiments thereof, especially when taken in conjunction with the accompanying drawings wherein like reference numerals in the various figures are utilized to designate like components, and wherein:

FIG. 9 is a flowchart showing steps of a method for selecting one or more representative frames from a video in accordance with a preferred embodiment of the system of the invention;

FIG. 17A is a screenshot of a user interface having a modified/edited image, and FIG. 17B is a screenshot of search results after a reverse image search for the image of FIG. 17A was performed in accordance with a preferred embodiment of the system of the invention;

FIG. 18A is a screenshot of a user interface having a modified/edited image, and FIG. 18B is a screenshot of search results after a reverse image search for the image of FIG. 18A was performed in accordance with a preferred embodiment of the system of the invention.

While the embodiments of the present disclosure are described herein by way of example using several illustrative drawings, those skilled in the art will recognize that the system of the invention is not limited to the embodiments or drawings described. It should be understood that the drawings and the detailed description thereto are not intended to limit this disclosure to the particular form disclosed, but to the contrary, this disclosure is to cover all modifications, equivalents, and alternatives falling within the spirit and scope of the embodiments of the system of the invention.

DETAILED DESCRIPTION OF INVENTION

In the following detailed description, numerous specific details are set forth in order to provide a thorough understanding of embodiments or other examples described herein. In some instances, well-known methods, procedures, components and circuits have not been described in detail, so as to not obscure the following description.

Further, the examples disclosed are for exemplary purposes only and other examples may be employed in lieu of, or in combination with, the examples disclosed. It should also be noted the examples presented herein should not be construed as limiting of the scope of embodiments of this disclosure, as other equally effective examples are possible and likely.

Figure 1:
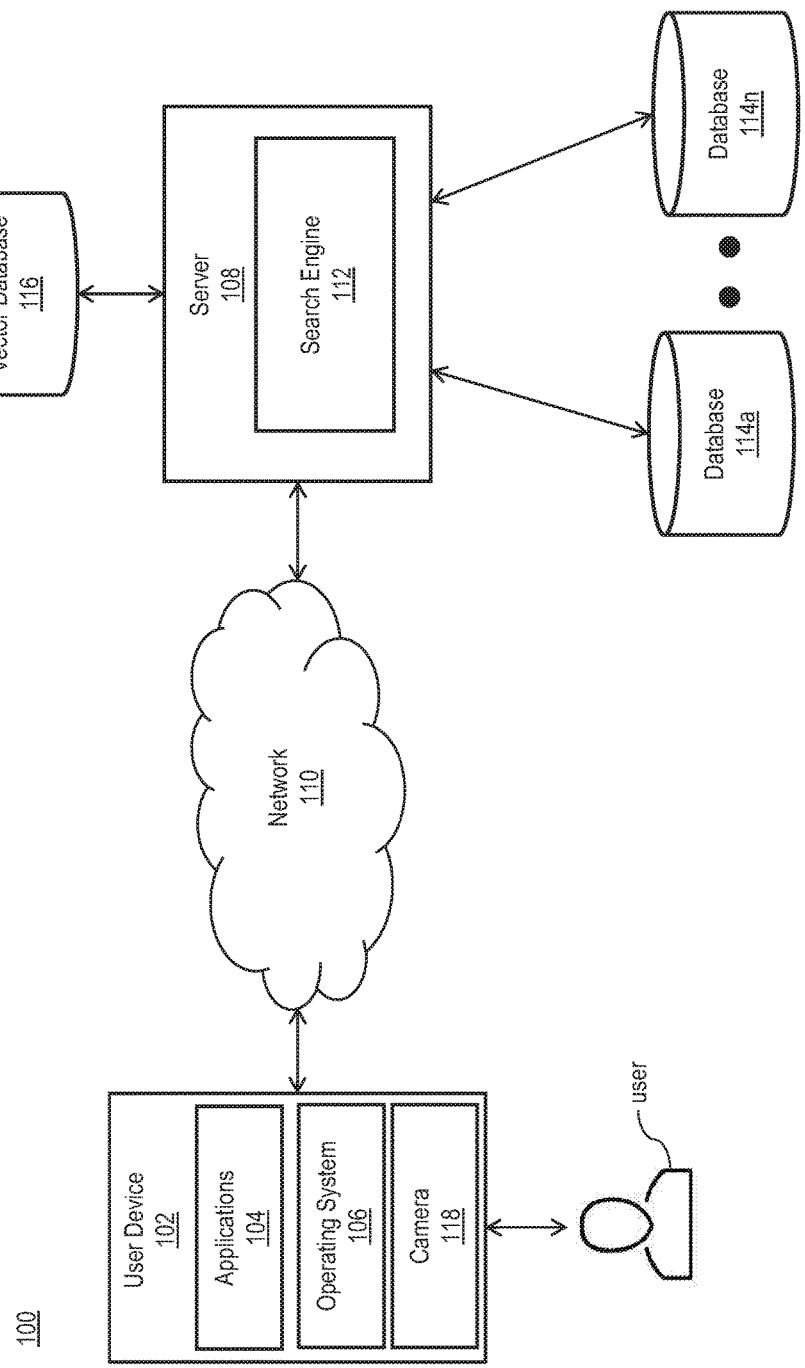
FIG. 1 is a diagram of a system for performing reverse image search in accordance with a preferred embodiment of the system of the invention.

FIG. 1 shows system 100, which enables searching for images based on a representative frames derived from an image or motion images (i.e., videos) as a search input. The representative frames are processed by processor 108 to create corresponding vectors, which are stored in vector database 116. As shown, system 100 includes processor or server 108 having one or more search engines 112 executing on it. Search engines 112 search through contents of digital libraries of images and videos or databases 114a-n. Although, FIG. 1 shows databases 114a-n being connected directly to processor 108, the databases can also be connected via communications network 110. Server or processor 108 provides a search service to a plurality of users, each utilizing one or more devices 102 that are connectable to processor 108 via communications network 110.

Devices 102 may be any mobile or desktop device, not restricted to, a computer, a laptop, a Personal Digital Assistance (PDA), a tablet, a smart phone, a palmtop, a notebook, a mobile phone, or any other computing device. It is also contemplated that devices 102 may support any type of user interface for supporting the visual and audio presentation of data. In addition, devices 102 may facilitate various input means for receiving, including, but not restricted to, a touch screen capability, a keyboard and keypad data entry, a voice-based input mechanisms, a camera based video input, and the like. As shown, devices 102 may include applications 104, various Operating System (OS) 106, and cameras 118. Application 104 may be any web or mobile application or a service such as, but are not restricted to, a web browser, a browser extension or plugin, a web application, a search software, or the like. OS 106 may provide basic execution environment for applications 104 on devices 102.

Communication network 110 may be, but is not restricted to, a telephony network, a wireless network, a data network, a service provider data network, and the like. For example, the telephony network may include, but is not restricted to, a circuit-switched network, such as the Public Switched Telephone Network (PSTN), an Integrated Services Digital Network (ISDN), a Private Branch Exchange (PBX), or other like networks. The service provider network may embody circuit-switched and/or packet-switched networks that may include facilities to provide for transport of circuit-switched and/or packet-based communications. It is further contemplated that communication network 110 may include components and facilities to provide signaling and/or bearer communications between the various components or facilities of system 100. In this manner, communication network 110 may embody or include portions of a Signaling System 7 (SS7) network, or other suitable infrastructure to support control and signaling functions. In addition, system 100 may operate as separate parts that rendezvous and synchronize periodically to form a larger system with similar characteristics. Further, the data network may be any Local Area Network (LAN), Metropolitan Area Network (MAN), Wide Area Network (WAN), the Internet, or any other suitable packet-switched network, such as a commercially owned, proprietary packet-switched network, such as a proprietary cable or fiber-optic network. Further, the wireless network may employ various technologies including, for example, Code Division Multiple Access (CDMA), Enhanced Data Rates For Global Evolution (EDGE), General Packet Radio Service (GPRS), Mobile Ad Hoc Network (MANET), Global System For Mobile Communications (GSM), 4G Long-Term Evolution (LTE), Internet Protocol Multimedia Subsystem (IMS), Universal Mobile Telecommunications System (UMTS), etc., as well as any other suitable wireless medium, e.g., microwave access (WiMAX), Wireless Fidelity (WiFi), satellites, and the like. Server 108 may be implemented locally on user device 102. For example, user device 102 may be a software application running on server 108 for sending queries to retrieve data.

User initiates a search by simply filming or training camera 118 on the device 102 on some object of interest. Maintaining the focus of camera 118 on the object pinpoints the object as being of interest, thereby identifying the captured images of the object as representative frames that the user wants to find. Alternatively, the representative frames can be pinpointed by user in some video feed on processor 108. In both cases, devices 102 and processor 108 convert the representative frames into corresponding vectors and store them and their corresponding images in databases 116/114.

Search engine 112 receives the corresponding vectors as a request or query and initiates a search in locally connected or network connected databases 114. Generally, databases 114 include vectors and their corresponding images. To identify or approximate nearest neighbors, i.e., to search for vectors or points in space that are close to a given query "Approximate Nearest Neighbors Oh Yeah" Annoy) a C++ library can be used. Alternatively, for the actual distance calculation Apache Solr can be used. This and other similar products will do the filtering on the clusterids, and then order the result according to distance to the vector given as input.

Also, a Structured Query Language (SQL) dataset can be queried by using SQL query. The query language may be in JavaScript Object Notation (JSON) data exchange format. However, a person skilled in the art will appreciate that any other data exchange format may be used, for example, but not limited to, eXtensible Markup Language (XML). Search engine 112 processes the received query to determine a structure and components of the query. For example, attribute-value pairs may be determined in case of a JSON query.

Further, system 100 uses neural network and machine learning techniques for image recognition. Image recognition makes it possible to find visually similar images in a reverse image searching. A pre-trained Convolutional Neural Network (CNN) is used for performing image analysis and classification. CNN is a class of deep, feed-forward artificial neural networks that can be used to analyze images. The CNN may be pre-trained, e.g., on ImageNet at www.image-net.org, which is a public dataset of more than 14 million images with labels.

Search engine 112 may:
1. receive the representative frames as an input image for search;
2. analyzes the representative frames for patterns; and convert the patterns into vectors, which are mathematical representation of the images;

3. the vectors are then used to search for pre-stored vectors having associated images, the stored vectors having similar patterns are identified using nearest neighbor techniques.
4. Thereafter, the matching results or images are selected from databases 116/114 and are displayed to users on their corresponding devices 102.

The methods for analyzing and searching the images are explained in detail below in conjunction with other figures.

Figure 2:
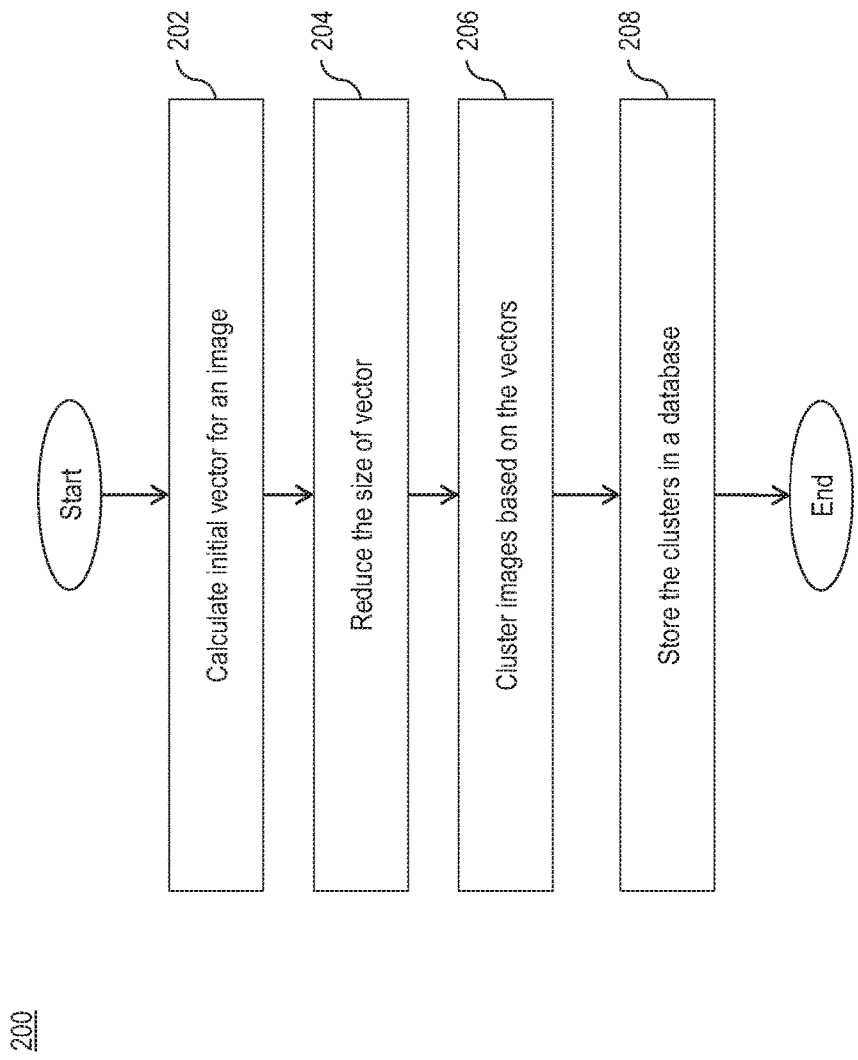
FIG. 2 is a flowchart of a method of forming a vector of pattern information of a representative frame or an image and of building a digital library or a database of the vectors of pattern information of the respective images in accordance with a preferred embodiment of the system of the invention.
Figure 3A:
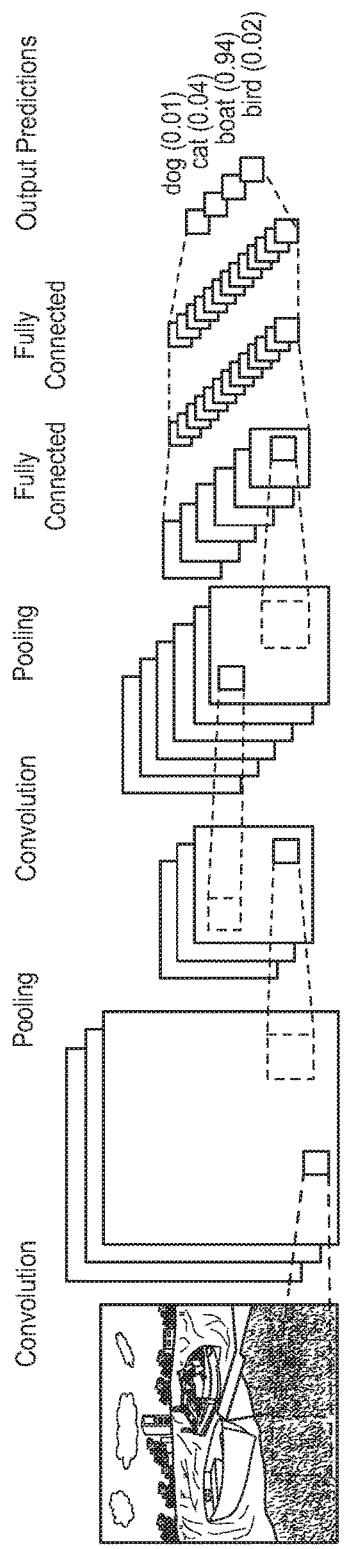
FIGS. 3A and 3B are sequences showing of a Convolutional Neural Network (CNN) process for forming vectors in accordance with a preferred embodiment of the system of the invention.
Figure 3B:
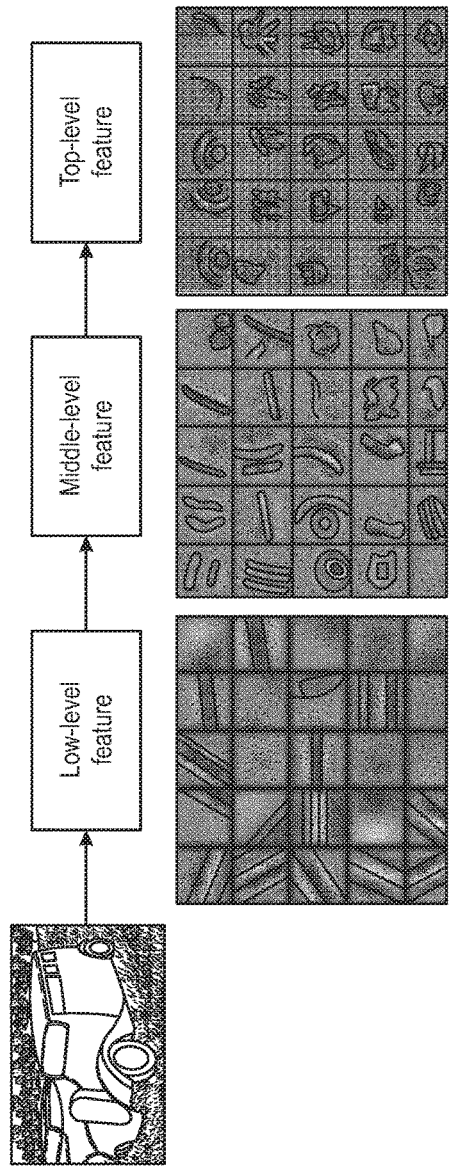

FIGS. 2, 3A, and 3B illustrates a method 200 for forming or generating the vectors having the image pattern information in accordance with an exemplary embodiment of the inventive system. As discussed above, CNN may be used for image classification. Given the representative frame, e.g., images of boats and/or cars FIGS. 3A and 3B, as input, CNN returns a list of probabilities of all classifiable objects in the images.

At step 202 (FIG. 2), an initial vector is calculated for the image. The vectors are mathematical representation of the image. The vector have a plurality of dimensions, e.g., 512 in CNN, the dimensions correspond to different attributes of the image. The vector information for the representative frames is taken before the layer where probabilities are calculated, as more information is available at this layer (e.g., fully connected layer). The probabilities range from 0 to 1. For example, as shown in FIG. 3A, the image containing a boat is analyzed through various processes such as convolution and pooling to output probabilities that the object is a dog as 0.01, cat as 0.04, boat as 0.94, and a bird as 0.02 in the last layer. Therefore, in this example CNN provides a prediction that the image contains a boat with a probability of 0.94. FIG. 3B illustrates a matrix of low-level, middle-level, and top-level features that can be extracted from an image containing a car.

Figure 4:
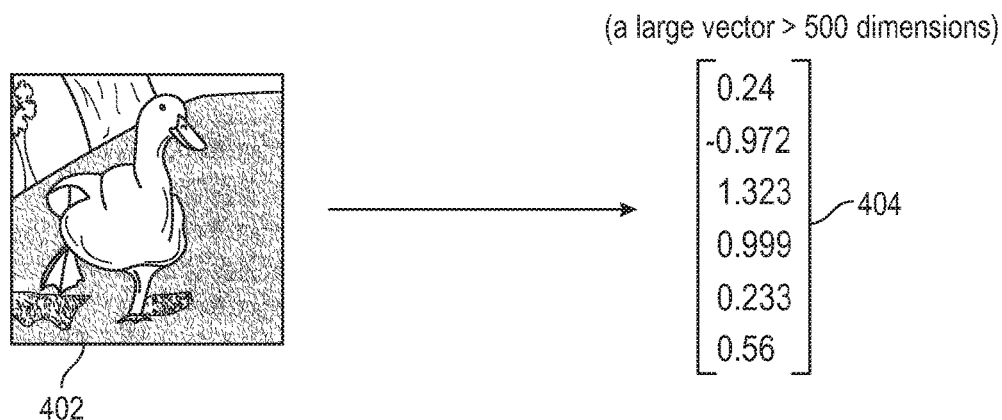
FIG. 4 is an exemplary image and its vector in accordance with a preferred embodiment of the system of the invention.

Returning to FIG. 2, at step 204, the size of the vector, e.g., vector 404 (FIG. 4), which was generated from an image 402 (FIG. 4) is reduced. There is a need to reduce the dimensions of the vectors because a large number of dimensions is burdensome on the speed of processing. Thus, it is very important to reduce the number of dimensions, so as to help speed up processing without losing precision. The number of vectors' dimensions may be reduced by using a neural network or an autoencoder. Also, Principal Component Analysis (PCA) may be used to reduce the dimensions.

Figure 5:
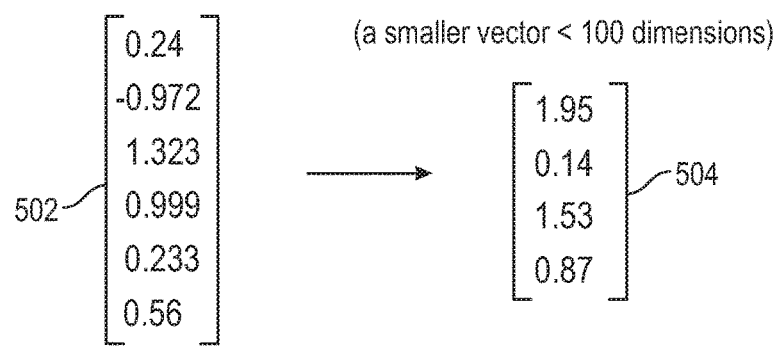
FIG. 5 is an example of reduction of an initial vector of FIG. 4 to an output vector in accordance with a preferred embodiment of the system of the invention.

The reduction of dimensions is illustrated in FIG. 5, here vector 502, which was formed as vector 404 (FIG. 4) from the image 402 (FIG. 4) is reduced to vector 504. As shown, the dimensions in output vector 504 are reduced as compared to those in the initial vector 502. The network is trained to give back the same output as its input, and there are several smaller hidden layers or steps between input vector 502 and output vector 504.

As a result, the neural network is forced to reduce the information from the vector through a much smaller layer but still try to maintain as much information as possible. The smallest hidden layer is used as the output. For example, for CNN it was determined that the number of dimensions may be reduced to about 8%. In other words the inventors have determined that a maximum trade-off between the quality of the image and the size of vector, in other words the smallest size can be around 40 dimensions.

For example, an may include 7 dense layers of the following sizes 512, 256, 128, 40, 128, 256, 512 (from input to output). Where the encoder part is the layers of sizes 512, 256, 128, and 40 and the decoder part is the layers 40, 128, 256, and 512. The activation function may be any commonly used activation function, for example relu, tan h, or sigmoid.

After training the network, the decoder part may be discarded, so only the encoder part, i.e. the layers of sizes 512, 256, 128, and 40 will be used. Accordingly, the layer of the size 40 will be the new output, and, therefore, the vector layers are reduced from size 512 to size 40.

The above-mentioned training the network is achieved using a subset of the vectors that were generated through the convolutional neural network, for example 0.5-1 million vectors may be used for training the autoencoder to assure a sufficient variety.

Returning again to FIG. 2, it is noted that the steps 202 and 204 are performed on a large set of images to generate enormous vector data information. For example, there may be more than 14 million images with vector information to be processed. To process such large set, at step 206, the vectors of the images are clustered and at step 208 stored in vector database 116 (FIG. 1).

Clustering

Figure 6A:
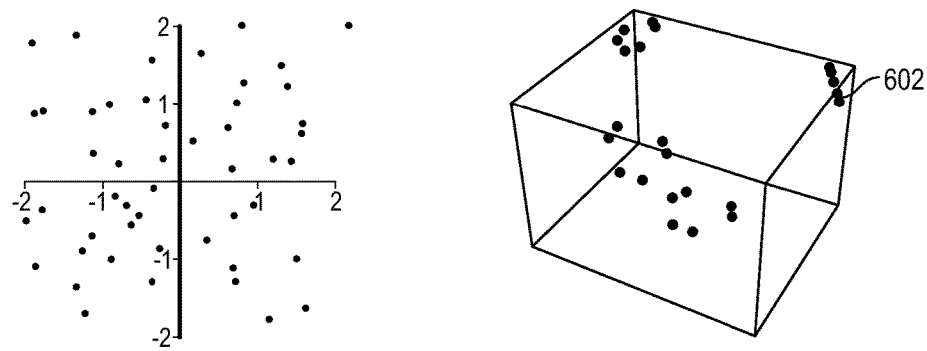
FIG. 6A is a 2-dimensional and 3-dimensional representation of an example of distribution of vectors of images.
Figure 6B:
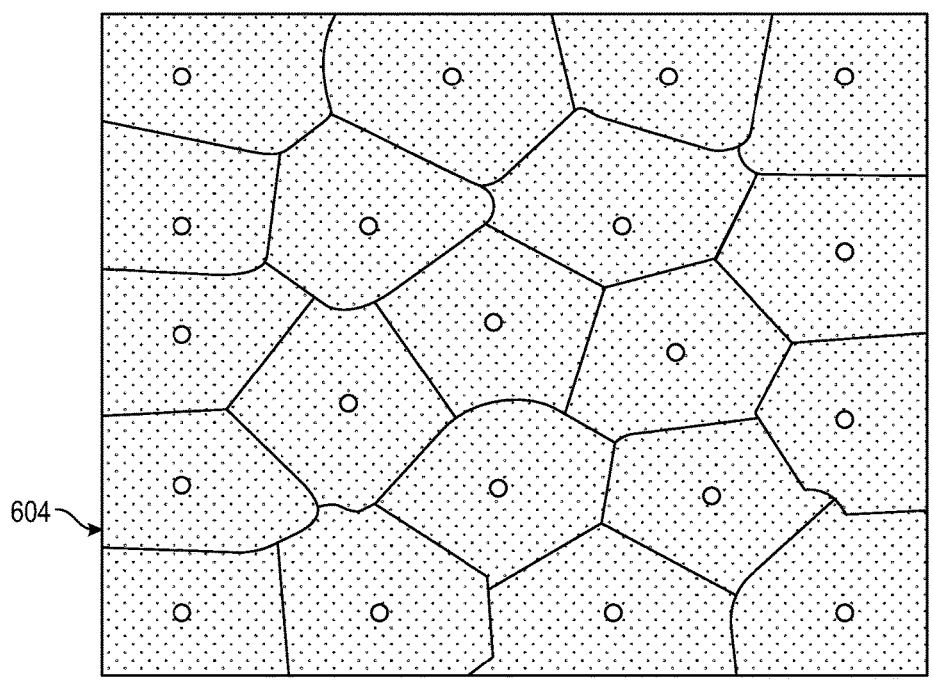
FIG. 6B is a diagram showing clusters of the vectors of the images in accordance with a preferred embodiment of the system of the invention.

Clustering enables increased performance by reducing the number of vectors to search through. For example, there may be millions of images with vector information to be processed, so clustering can generate subsets that can be used for searching images. K-means algorithm may be used to perform the clustering. A person skilled in the art will appreciate that other clustering algorithms such as, but not limited to, EM clustering, affinity propagation can be used to perform the clustering. FIG. 6A illustrates 2-dimensional and 3-dimensional representations of vectors of images. Clusters may be generated or calculated differently for photos, videos, illustrations, as these are visually quite different. FIG. 6B illustrates the clusters generated from the vectors of the images. For example, the vectors 602 having similar information may be grouped to form a cluster 604.

The algorithm for clustering may adjust dynamically to determine the number of clusters. For example, for photos an initial condition may be provided to start with 120 clusters and then let the algorithm or software to calculate and make sure no cluster contains no less than 30,000 vector items or photos and no more than 500,000 vector items. Therefore, if there are more than 500,000 vector items, then the algorithm may start with 121 clusters and then recalculate. In case, the algorithm reaches less than 30,000 vector items in a cluster, it stops, regardless if there are still more than 500,000 vector items in a cluster. The algorithm may only break apart the largest clusters instead of recalculating all of them. This cluster calculation may only be performed once, and the cluster centers, indicated by a thick dot at the center of each cluster of FIG. 6B, are not updated after this initial calculation.

Figure 7:
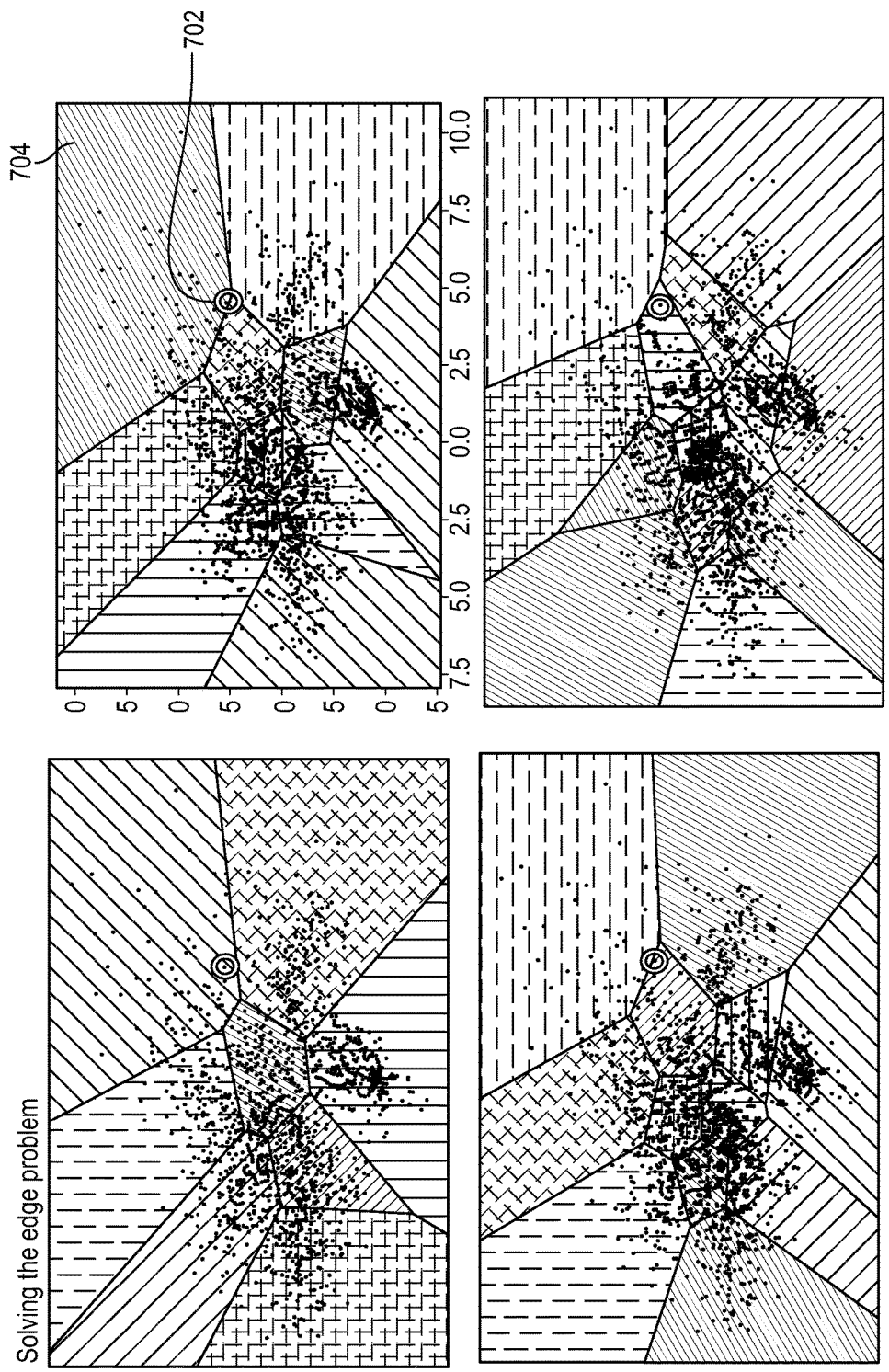
FIG. 7 is an illustration of distribution of vectors, their clustering, correction of the "edge problem" by re-clustering of the vectors using a different number of clusters in accordance with a preferred embodiment of the system of the invention.

Importantly, a vector item may be located at an edge of a cluster, in such case, it may have more features in common with vector items that are in the neighboring cluster rather than the vector items that are in the same cluster as it belong. FIG. 7 illustrates four differently clustered sets with eight, ten, eleven, and thirteen clusters. The clusters are shown as differently sized partitions of the space, with vector items displayed as dots within the clusters. As shown, a vector item 702 may be on the edge of cluster 704.

Several other cluster sets are re-calculated to reduce vector items that are positioned on the edge of the clusters. For example, if a first set may have 140 clusters, the second set will have 141 clusters. Moreover, the second set may have different starting points or vectors to start calculating from. Similarly, a third set may have 142 clusters and a fourth set of 143 clusters. Therefore, vector items in the clusters may be slightly different for each set, since the number of clusters are not the same and the way to calculate is slightly different.

Four sets are therefore calculated in the examples of FIG. 7. Therefore, when searching through the union of the sets, the union will include all the vectors that are nearby, including those vector that would have been in a different cluster, e.g., if the several sets of cluster were not calculated. Therefore, using the sets of clusters solve the edge problem. For example, a sample search query can be "take all vector items that are in any of the clusters [A, B, C, D] and order them according to closeness to the vector X". This greatly improves the performance of the search engine 112 (FIG. 1) because the number of calculations required for the search is reduced.

To determine which cluster a new vector item of a photo belongs to, the vector is calculated and compared with the stored vectors and the closest existing vector, or the nearest neighbor, is selected. For example, 140 clusters for images may have 140 vectors that are at the center of each cluster. Therefore, the vectors for the new item may be compared to only these 140 clusters or vectors to select a closest match. Multiple clusters for the same image set may be stored in databases 114 (FIG. 1). Thus, multiple clusters may be searched as explained above in conjunction with FIG. 7.

Figure 8A:
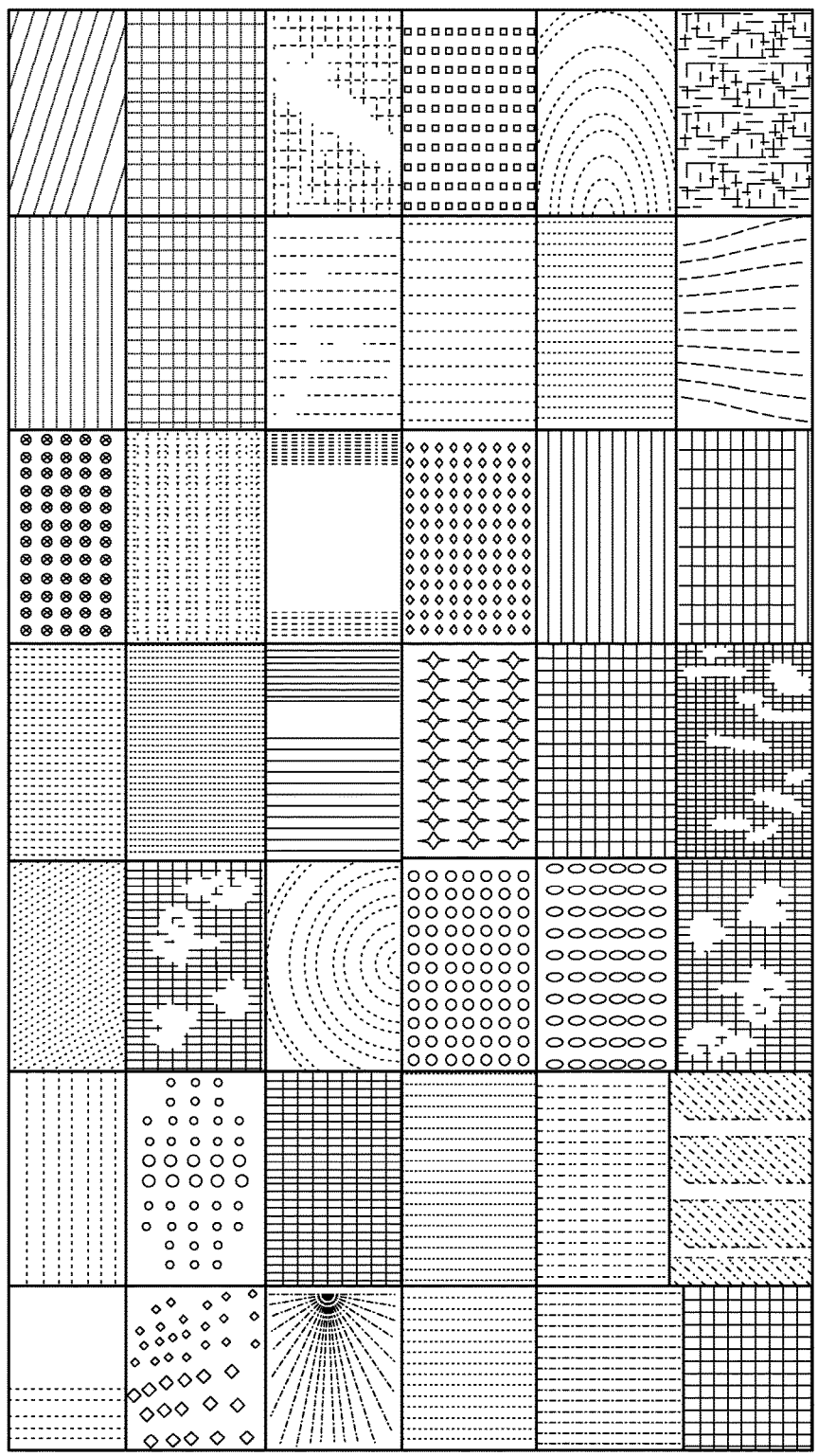
FIGS. 8A-8C are examples of images corresponding to vectors in the exemplary clusters shown in FIG. 7, in accordance with a preferred embodiment of the system of the invention.
Figure 8B:
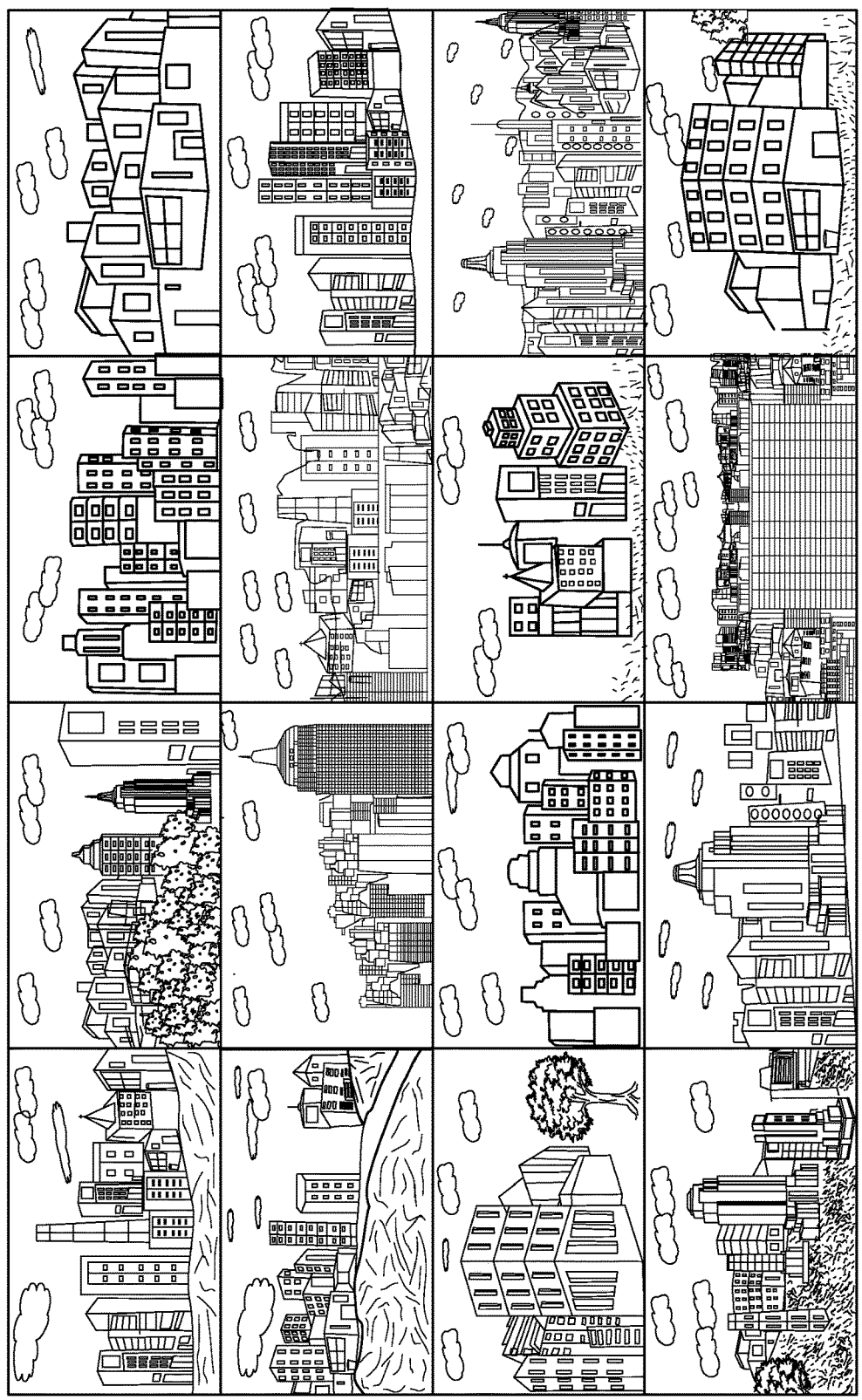
Figure 8C:

FIGS. 8A-8C illustrate images that comprise exemplary clusters that were generated as discussed above. FIG. 8A depicts clusters of images with each image having a corresponding dot (see FIG. 7). FIG. 8B depicts clusters of images who's vectors represent buildings or city skyline. FIG. 8C depicts clusters of images who's vectors represent plants or foliage.

Representative Frames

FIG. 9 illustrates a method 900 for selecting representative frames from a video. First, multiple frames of a video or motion image are selected at step 902. Ten frames or images may be selected, for example. Each frame is then processed to calculate a number of pixels for each color value, at step 904. For example, RGB, YUV, LAB or other color spaces are calculated. The R, G, and B components are treated and processed completely separately. Thereafter, at step 906 a score is calculated for each frame based on the R, G, B counts and a scaling. The scaling is calculated based on the total number of pixels in the frame by using a formula: scaling=100/number of pixels For example, for an image of size 10×20 pixels, the scaling would be 100/(10×20), i.e., 0.5. The score may be calculated by using the formula:

$$\text{score} = \log 2(1.0 + \text{scaling} \times \text{number of pixels in bucket})$$

The log function penalizes large areas of the same color, so that a representative frame with the most diversity is selected. The bucket is the R, G, or B colors. 64 shades of each R, G, B, may be used, so there will be 64 buckets in each. The score for all buckets is summed to obtain a total score for each frame. For example, considering an image having 10 pixels including:

3 red pixels (i.e., r=1, g=0, b=0)
3 white pixels (i.e., r=1, g=1, b=1)
4 black pixels (i.e., r=0, g=0, b=0)

The scaling for the image would be 10 (i.e., 100/10). Assuming only two buckets, one containing zeros and the other containing ones, the number of pixels in each bucket may be determined to be:

red: 3+3,4=6,4 (i.e., 6 pixels having ones and 4 having zeros)
green: 3,3+4=3,7
blue: 3,3+4=3,7

The scores for each bucket may be calculated as:

\# red $$\#\text{score}\_r1 = \log 2(1.0 + \text{scaling} \times \text{number\_of\_pixels\_in\_bucket}\_r1)$$

$$\text{score}\_r1 = \log 2(1.0 + 10 \times 6)$$

$$\#\text{score}\_r2 = \text{score} + \log 2(1.0 + \text{scaling} \times \text{number\_of\_pixels\_in\_bucket}\_r2)$$

$$\text{score}\_r2 = \log 2(1.0 + 10 \times 4)$$

\# green $$\text{score}\_g1 = \log 2(1.0 + 10 \times 3)$$

$$\text{score}\_g2 = \log 2(1.0 + 10 \times 7)$$

\# blue $$\text{score}\_b1 = \log 2(1.0 + 10 \times 3)$$

$$\text{score}\_b2 = \log 2(1.0 + 10 \times 7)$$

Total score can be calculated as sum of all scores:

$$\text{Total score} = \text{score}\_r1 + \text{score}\_r2 + \text{score}\_g1 + \text{score}\_g2 + \text{scoreb1} + \text{scoreb2}$$

Subsequently, at step 908 the total score for each frame is compared to the others to select a frame with the highest score as the representative frame. The image recognition process as discussed above may be performed on this representative frame to identify images for reverse image search. Therefore, the system of the invention can be used for real time image recognition from a live photo or video taken on a mobile device or other camera, recognizing the primary focus of the image or video, and returning visually similar results.

Videos commonly include many frames, generally 24 of more frames per second. The system of the invention provides a significant enhancement in technology of image recognition and search by real time context determination from a video and searching visually similar results in real time.

Search

Figure 10:
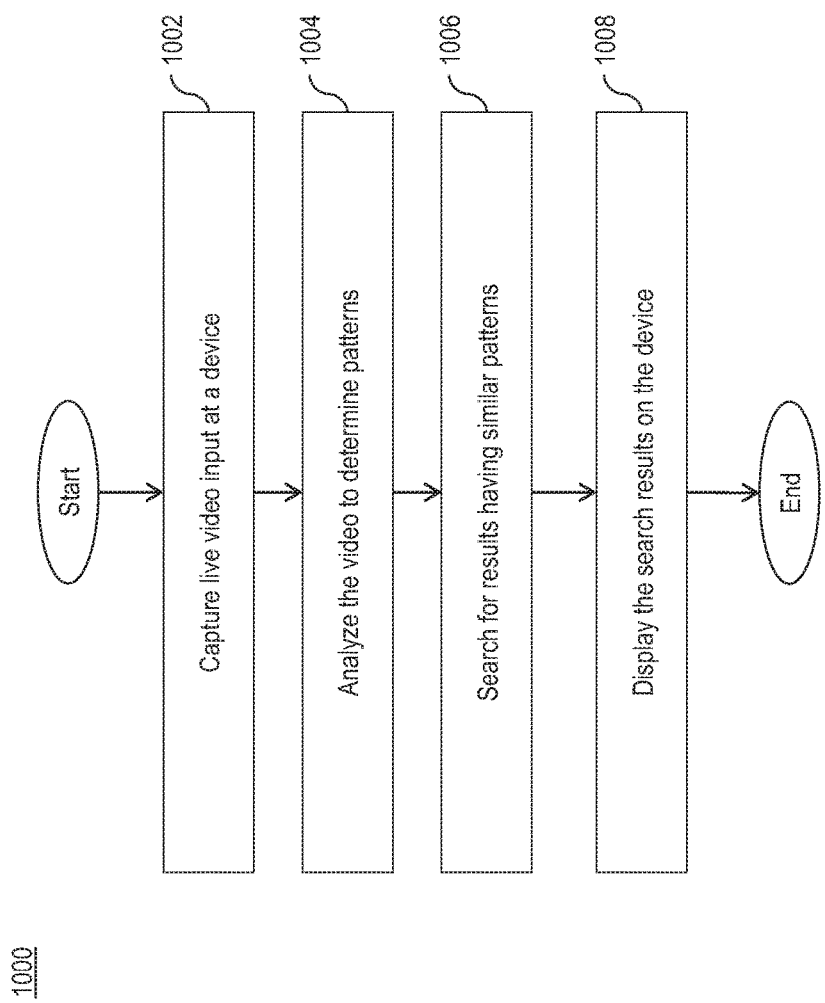
FIG. 10 is a flowchart showing steps of a method for performing reverse image search in accordance with a preferred embodiment of the system of the invention.

FIG. 10 illustrates a method 1000 for performing a reverse image search. At step 1002, a live image or video is captured from a user device. The video is captured, e.g., using camera 118 (FIG. 1) of device 102 (FIG. 1). For example, a video may be captured from a camera on a mobile phone. The video can be uploaded to determine a representative frame and to perform the search. Accordingly, at step 1004, the video frames are analyzed to determine patterns. The patterns may be based on the vectors or scores for the representative frame of the video, as discussed in detail above. The representative frame of the video is determined in real time as the video is being captured by camera 118, by application 104 (FIG. 1) on device 102. For example, the application software may be a mobile application, a web application, or a web browser. The application software may be a web browser extension. The analysis is performed by search engine 112 (FIG. 1).

Thereafter, at step 1006, search for results, i.e., vectors representing images having similar visual patterns is performed, e.g., in databases 116/114 (FIG. 1). Subsequently, the search results may be displayed on the device 102 (FIG. 1). The search results are updated automatically based on a change in context or focus of the representative frame. The user of device 102 can start, stop, and resume the live search to see the results along with a reference image of the representative frame. Further, the user can also browse and collapse/expand the live search. The live search stops automatically after populating the result sets. For example, the search may be stopped to display 10 results, and then automatically starts if the user elects to see more results. Thereafter, at step 1008 the search results with the best match can be displayed by search engine 112. As a result, the speed and performance of the search is improved.

Alternatively, more than one representative frame can be determined and used in a search. In fact numerous representative frames can be determined from a variety of simultaneous or subsequent video streams or images. The determined multiple representative frames can be all used to perform the search or can be presented as a choice. Similarly, one or more representative frames can be pre-determined or pre-selected and used in a search with a representative frame determined from the live stream.

Live Search Interface

Figure 11:
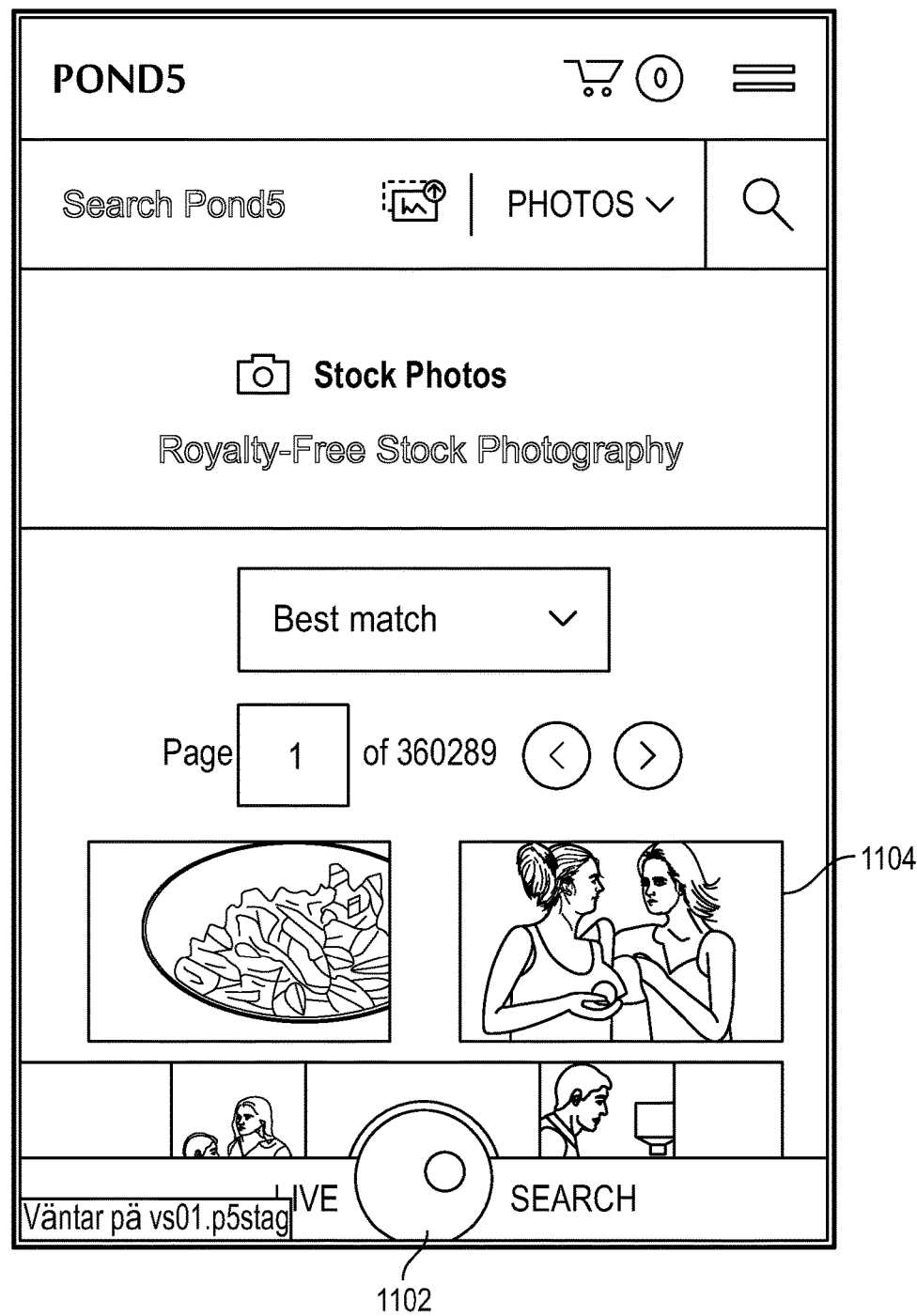
FIG. 11 is a screenshot of a user interface of a method for performing a reverse image search in accordance with a preferred embodiment of the system of the invention.
Figure 12A:
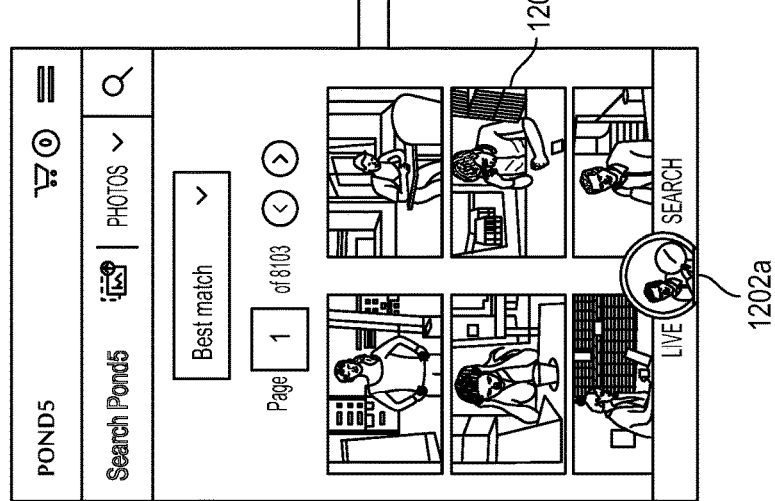
FIG. 12A-12C are screenshots of a user interface, including results, of a method for performing a reverse image search from a video in accordance with a preferred embodiment of the system of the invention.
Figure 12B:
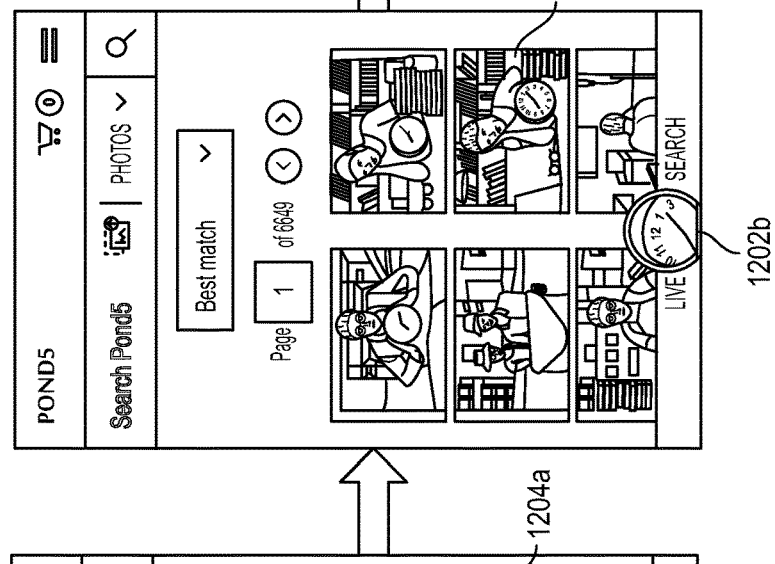
Figure 12C:
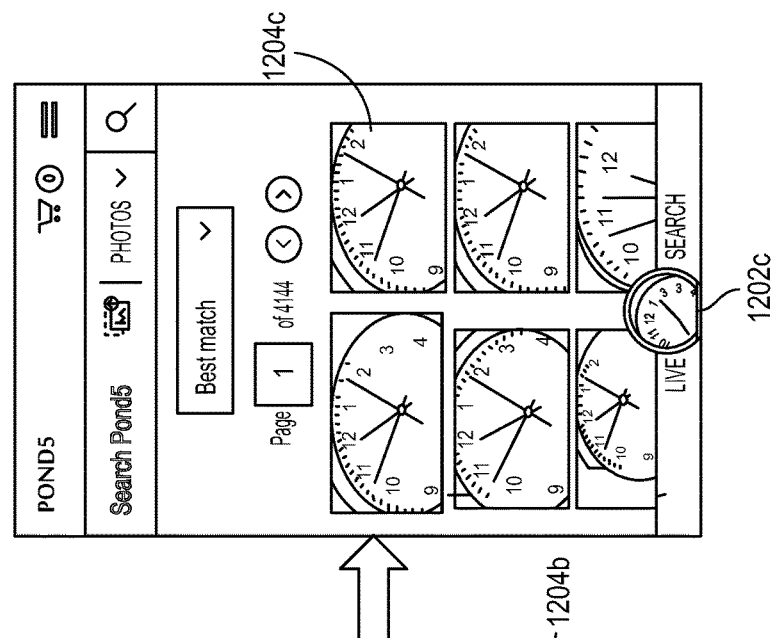

FIG. 11 illustrates a user interface of application 104 (FIG. 1) on device 102 for performing the reverse image search. As shown, the user interface may include a live video display 1102 that presents the live video stream that is being captured by a camera of device 102. The results of the search are displayed as the search results 1104, in real time, as the video is captured. The user interface is further shown in FIGS. 12A-12C displaying results of a reverse image search from the captured live video. FIG. 12A shows live video display 1202a being captured by the camera of device 102. As shown, the frame in live video display 1202a, shows a man holding a clock, accordingly search result images show 1204a include humans When, as in FIG. 12A the video display 1202b focuses on the clock, clocks begin to figure more dominantly as search results 1204b with humans still being present. Then, once application 104 senses that humans are no longer figuring in the representative frame of live video display 1202c, humans are no longer present and the clocks dominate search results 1204c. This is how, the real time search results of one embodiment of the system of the invention are provided during live video capture.

Editing Representative Frames

Figure 13:
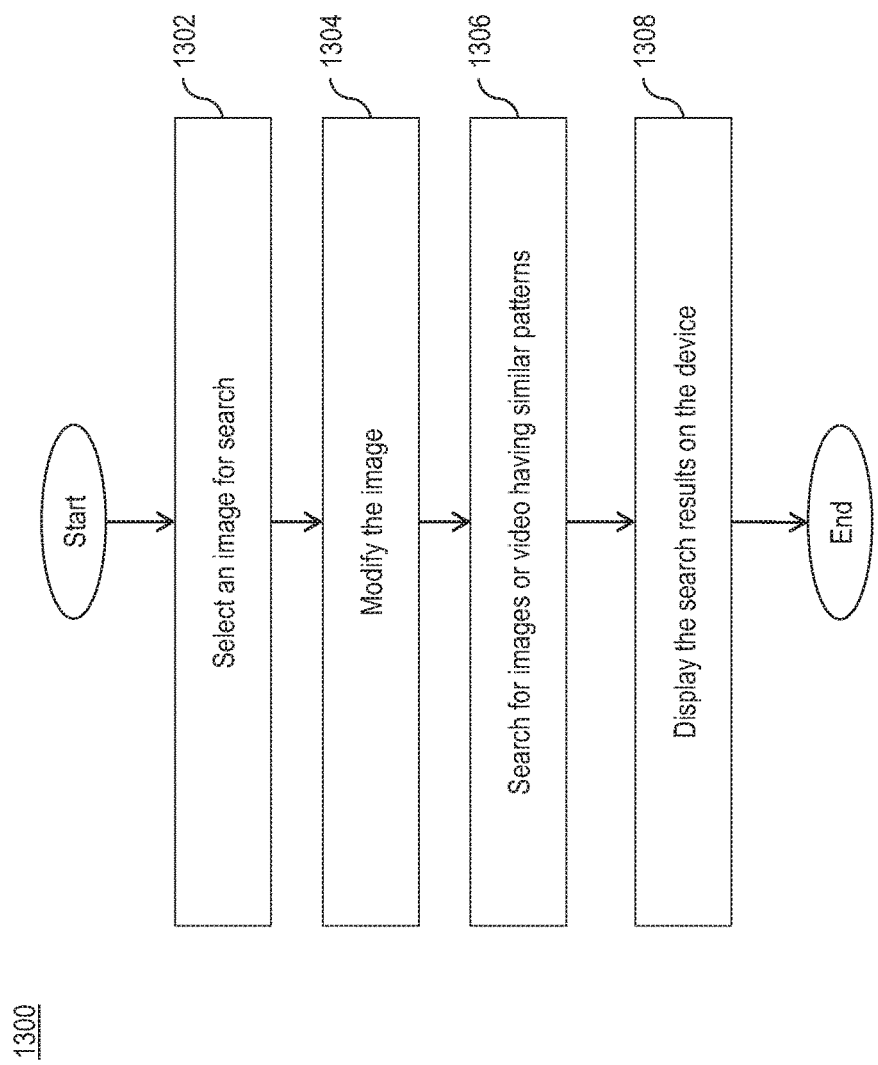
FIG. 13 is a flowchart of a method for performing a reverse image search in accordance with a preferred embodiment of the system of the invention.

FIG. 13 illustrates a method 1300 for performing a reverse image search. At step 1302, a representative frame of an image may be selected as an input to search for visually similar images, illustrations, or videos. The image may be selected from any page or URL and displayed on an application, such as a web browser. Further, a portion of the displayed image may be selected for search. Thereafter, at step 1304, the image may be modified. For example, the image may be modified to add or remove objects, or superimpose another image or object on the image. The modification is enabled by an application 104 (FIG. 1), such as a browser extension on device 102 (FIG. 1).

At step 1306, a search is performed for the image selected or modified by the user. The search is performed for visually similar images, illustrations or video by determining and matching patterns, as discussed in detail above. Subsequently, at step 1308, the search results may be displayed to user on device 102. The search results may also be displayed on a predefined website that is connected to processor 108 (FIG. 1) and or device 102. Moreover, various attributes associated with the search results may be displayed on the predefined website. For example, the attributes may include, but are not limited to, the size of the displayed images, the similarity value of the images, color values of the images, their price, what collection they belong to, etc. The system provides an ability to manipulate the attributes to further refine the search by and even allow outright selection of any image from search results to repeat the search process.

Figure 14:
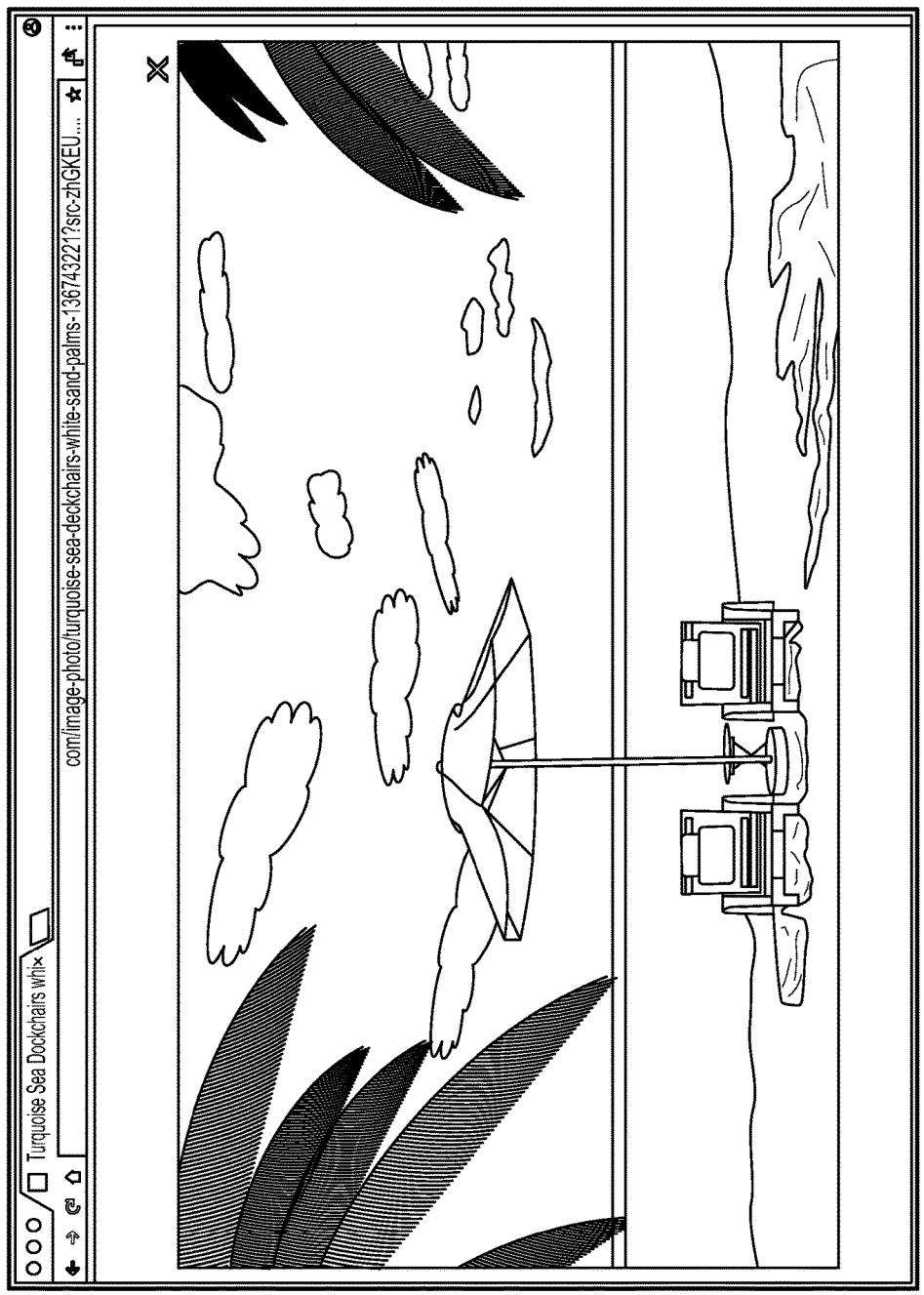
FIG. 14 is a screenshot of a user interface, including an image, of a method for performing a reverse image search in accordance with a preferred embodiment of the system of the invention.
Figure 15:
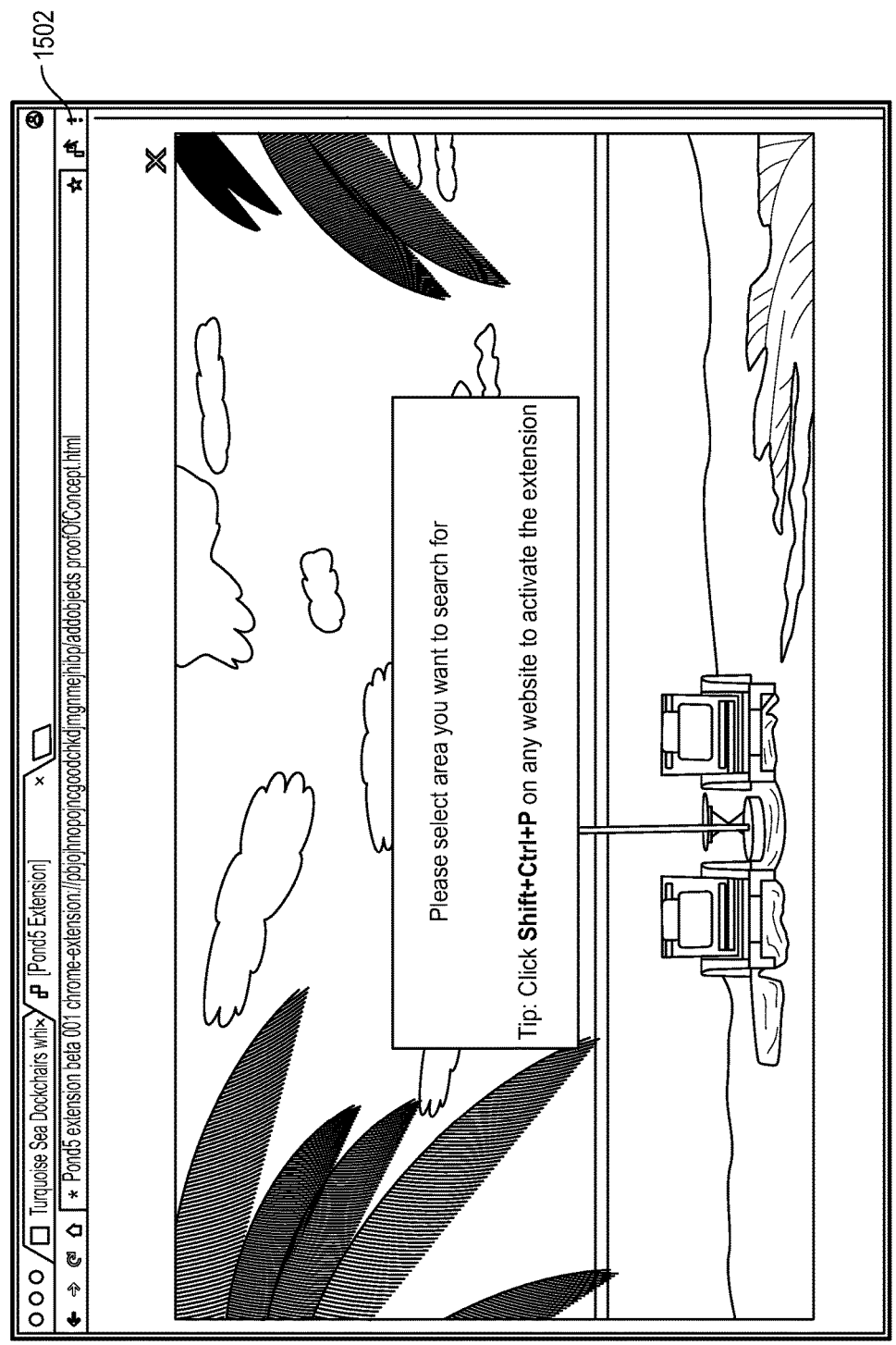
FIG. 15 is a screenshot of a user interface, including an image and a prompt to begin searching, of a method for performing a reverse image search in accordance with a preferred embodiment of the system of the invention.
Figures 16A, 16B:
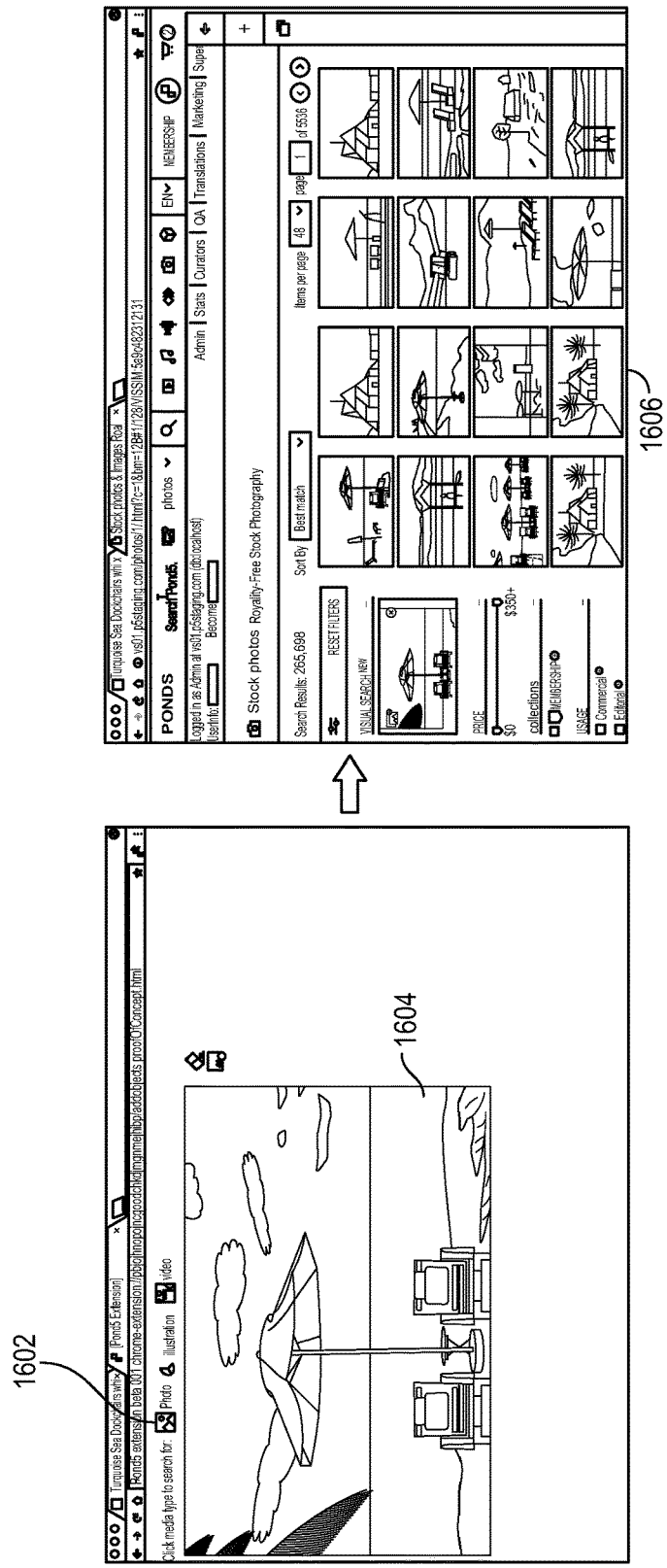
FIG. 16A is a screenshot of a user interface having an image and FIG. 16B is a screenshot of search results after a reverse image search for the image of FIG. 16A was performed in accordance with a preferred embodiment of the system of the invention.

FIG. 14 shows an interface that enables selection, modification, and editing of the images, or the representative frames. As shown, an image selected and displayed on the web browser. FIG. 15 shows an interaction, where user (FIG. 1) is asked to select an area of the image for the reverse image search. A browser extension 1502 may be added to any commonly used network browsing program to perform the reverse image search functions of the system of the invention. FIG. 16A shows various functions, which may be added to the browser program for performing the search. A photo search option 1602 directs the application to perform the reverse image search, as discussed at length above, for selected image 1604, which can be thought of as the representative frame. Subsequently, the search results may be displayed on the predefined website. FIG. 16B illustrates the predefined website and results 1606 of the reverse image search of the representative frame 1604 (FIG. 16A.

FIG. 17A shows how selected image 1702 may be edited to remove object 1704. Thereafter, upon selection of photo search option 1706 application is directed to perform the reverse image search. The search results based on modified image 1702, which now do not include the object 1704 (i.e., an umbrella or chairs), are displayed as shown in FIG. 17B. A person skilled in the art will appreciate that any amount of modification may be done to the image, for example, but not limited to, a change in color, hue, saturation, size, etc. Options for such modifications are provided as displayed on the lower left side of the display of FIGS. 16B and 17B.

In removing objects the system of the invention assures that the removed objects aren't reconstructed. For example, using inpainting strategies is not ideal, since the object may not have been removed completely and the inpainting algorithm actually may reconstruct the removed object. If that would happen, the "removed" object would again be included in the visual search.

To avoid this problem, embodiments of the system of the invention take the color values of the left and right of the removed area, and then do a line wise gradient across. The removed area would then include lines in different gradient colors. Since these lines can still be interpreted as some kind of structure, e.g., a building block, a box or similar, this structure needs to be broken up. A couple of different ways of doing this can be employed, and randomly alternated. For example, taking a pixel in the removed area 1704 and its surrounding pixels, and then randomize the ordering of those pixels. Taking the pixel values of three pixels above and below, randomly choosing two, performing a gradient, and assigning that value to the pixel and other similar ways to randomly chose pixel values. The result will be that the removed area consist of pixels without any real structure, and hence little chance that CNN will interpret it as an object.

FIG. 18A shows how a selected image can be modified by superimposing one or more image on it. For example, as shown, the user may search for an image of a man by inputting a keyword into search box 1802. Subsequently, image of a man 1804 is found and displayed. Image 1804 may be dragged and dropped on the selected image 1806 to superimpose the image. Image 1804 may be manipulated to change the size, angle, or position on the selected image 1806. The selected image 1806 may be superimposed by multiple images. Thereafter, the photo search option 1808 may be selected to direct the application to perform the reverse image search. Results of the search superimposing image 1804 on the representative frame 1806 are shown in FIG. 18B. As shown, the search results now include images of a human and a horse near water.

Figure 19:
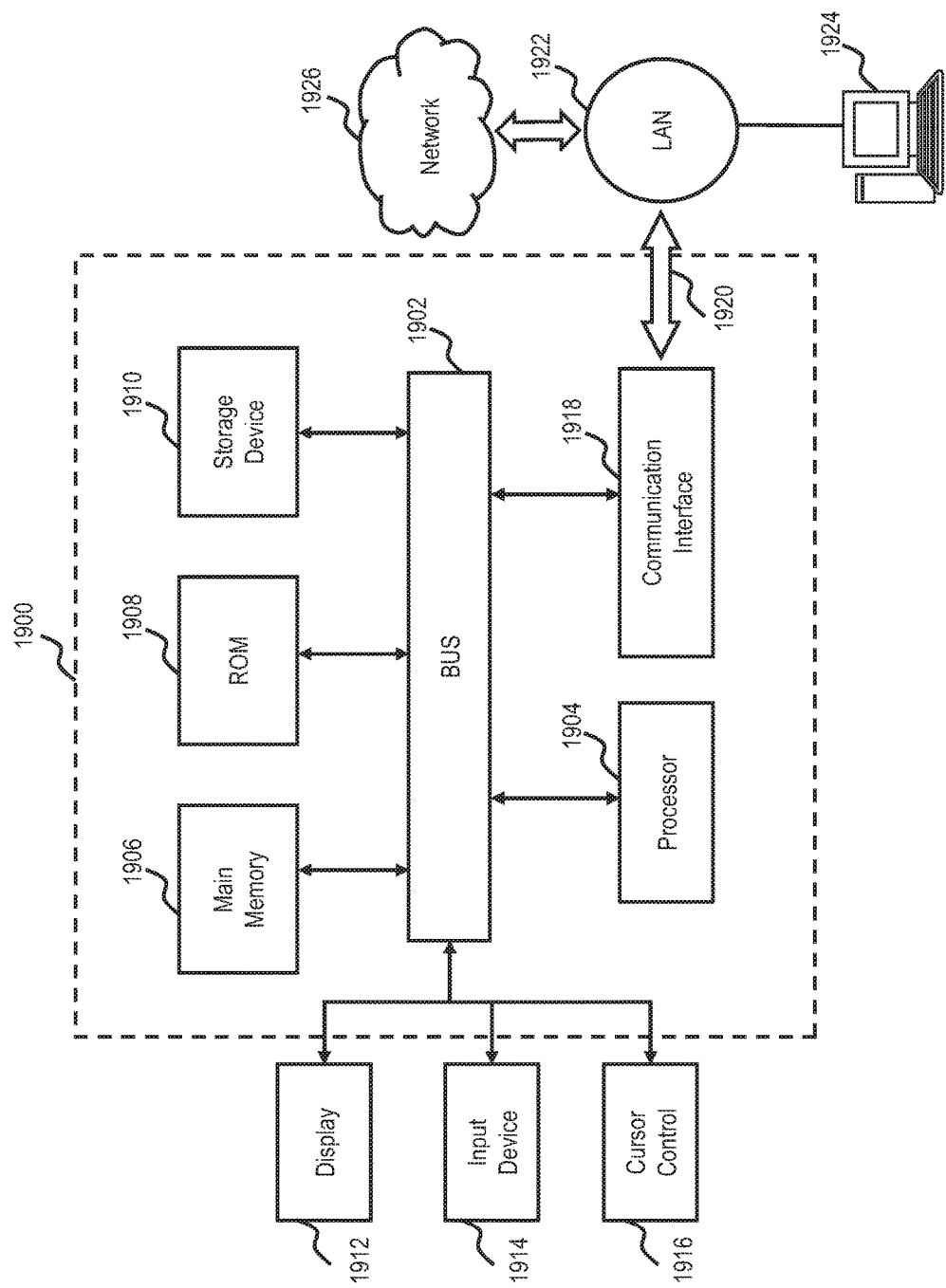
FIG. 19 is a computer system used to implement various exemplary embodiments in accordance with the system of the invention.

FIG. 19 illustrates computing system 1900. Embodiments of the inventive system may be implemented on a computing system having at least a subset of components of computing system 1900 described below. Computing system 1900 comprises bus 1902 for communicating information between all the components of computing system 1900, bus 902 is connected to processor 1904; main memory 1906, such as a Random Access Memory (RAM) or other dynamic storage device, for storing (a) the information and instructions to be executed by processor 1904, and (b) temporary variables or other intermediate information during execution of instructions by processor 1904; Read Only Memory (ROM) 1908 or other static storage device for storing static information and instructions for the processor 1904; storage device 1910, such as a magnetic disk or an optical disk for persistently storing information and instructions; display 1912, such as a Cathode Ray Tube (CRT), a liquid crystal display, an active matrix display, or a plasma display for displaying information to a user; input device 1914, such as a keyboard including alphanumeric and other keys, for communicating information and command selections to the processor 1904; user input device 1916 such as a cursor control, a mouse, a trackball, or cursor direction keys, for communicating direction information and command selections to processor 1902 and for controlling cursor movement on display 1912; communication interface 1918, e.g., a Digital Subscriber Line (DSL) card or modem, an Integrated Services Digital Network (ISDN) card, a cable modem, a telephone modem, a Local Area Network (LAN) card (e.g., for Ethernet™ or an Asynchronous Transfer Mode (ATM) network) to provide a data communication connection to a compatible LAN; Wireless links; or any other communication interface, for providing a two-way data communication coupling via a network link 1920 to a Local Area Network (LAN) 1922; peripheral interface devices, such as a Universal Serial Bus (USB) interface, a Personal Computer Memory Card International Association (PCMCIA) interface, etc. Although single components of each kind are depicted in FIG. 19, multiple components may be employed or the component may be left out as necessary.

Network link 1920 typically provides data communication through networks to other data devices. For example, network link 1920 may provide a connection through LAN 1922 to host computer 1924, which has connectivity to network 1926 (e.g., a Wide Area Network (WAN) or the global packet data communication network now commonly referred to as the "Internet") or to data equipment operated by a service provider. LAN 1922 and network 1926 both use electrical, electromagnetic, or optical signals to convey information and instructions.

The term "computer-readable medium" as used herein refers to any medium that participates in providing instructions to processor 1904 for execution. Such a medium may take many forms, including but not limited to non-volatile media, volatile media, and transmission media. Non-volatile media may include, for example, optical or magnetic disks, such as storage device 1910. Volatile media may include a dynamic memory, such as main memory 1906. Transmission media may include coaxial cables, copper wire, and fiber optics, including the wires that include bus 1902. Transmission media may also take the form of acoustic, optical, or electromagnetic waves, such as those generated during Radio Frequency (RF) and infrared (IR) data communications. Common forms of computer-readable media may include, for example, a floppy disk, a flexible disk, hard disk, magnetic tape, any other magnetic medium, a CD-ROM, a Compact Disc-Rewritable (CDRW), a Digital Video Disk (DVD), any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read. In certain cases, the computer readable media may include an unknown physical component wherein the information is uniquely defined by a special digital unique identifier and is available through multiple physical channels either simultaneously or exclusively.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. Also, a number of variations and modifications of the present inventive system can be apparent to these skilled in the art.

Each element in the embodiments of the present disclosure may be implemented as hardware, software/program, or any combination thereof. Software codes, either in its entirety or a part thereof, may be stored in a non-transitory computer readable medium or memory (e.g., as a RAM, ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source, and object code such as partially compiled form, or in any other form.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

The invention claimed is:

1. A method of real-time reverse image searching for one or more images analogous to a representative frame having one or more patterns, the method comprising steps of:
   providing a computing device connected to the network, the computing device:
      capturing, in real time, one or more images; and
      identifying at least one of the captured one or more images as the representative frame for use as input in the reverse search;
   providing a processor connected to a network and having access to at least one digital library warehousing a plurality of vectors and respective images and videos associated with each of the plurality of vectors, the processor:

calculating one or more mathematical representations for each of the one or more patterns in the representative frame to form a representative vector, the one or more mathematical representations corresponding to dimensions of the vector;

reducing a size of the vector by reducing a number of the dimensions to one of about 8% and a maximum trade-off between the quality of the image and the size of vector;

detecting, in the at least one digital library, one or more of the plurality of vectors that are most similar to the vector of the representative frame; and offering, in real-time via the network, images and videos associated with the selected one or more of the plurality of vectors, wherein a number of the offered images and videos is pre-determined.

2. The method of claim 1, wherein the computing device comprises at least one video camera and the capturing is selected from one of training the at least one video camera on an object of interest and/or uploading an image and a video.

3. The method of claim 2, wherein the captured one or more images are updated automatically in response to a change in a context of the representative frame.

4. The method of claim 1, wherein the representative frame comprises a plurality of representative frames and at least one of the plurality of representative frames is one of a pre-selected representative frame and a representative frame selected in real-time.

5. The method of claim 1, wherein identifying the representative frame comprises steps of:

selecting a first plurality of frames of the video;

calculating, for each frame, a number of pixels for each color value, the color value is selected from one of RGB, YUV, and LAB, wherein components of the color value are processed separately, and a score based on the color value of the components and a scaling based on the total number of pixels in the frame using a formula where score=log 2 (1.0+scaling×number of pixels); and comparing a sum of all scores in each frame to the sum of all scores of all of the first plurality of frames, wherein a frame of the first plurality of frames having a highest sum of all scores is selected as the representative frame.

6. The method of claim 5, wherein the step of identifying the representative frame further comprises steps of:

receiving the at least one of the captured one or more images as still images and/or video, the captured one or more images are selected from 2-dimensional images and 3-dimensional images; and editing the representative frame by removing portions of the one or more patterns from, and/or adding one or more patterns to the representative frame.

7. The method of claim 6, further comprising a step of identifying one or more attributes of images corresponding to the detected one or more of the plurality of vectors, wherein the attributes are selected from at least one of a size, a degree of similarity to the representative frame, color, a value, and a membership in a specific of the at least one digital library.

8. The method of claim 6, wherein the step of adding one or more patterns to the representative frame comprises steps of:

superimposing one or more additional patterns on to the representative frame, and changing any of a size, an angle, and a position of the superimposed one or more additional patterns in the edited representative frame.

9. The method of claim 1, further comprising the steps of:

clustering the plurality of vectors in the at least one digital library to form a first number of clusters; and re-clustering the plurality of vectors to form a second number of clusters different from the first number, wherein the number of clusters is determined dynamically to correct an edge problem.

10. The method of claim 9, wherein unions of re-clustered sets are used in the reverse search, and the clustering and re-clustering is automatically updated due to changes in the representative frame.

11. The method of claim 1, wherein the mathematical representations is a probability in a range from 0 to 1 of each of the one or more patterns being present in the representative frame, and the step of reducing utilizes at least one of neural network techniques, an autoencoder and Principal Component Analysis (PCA).

12. The method of claim 1, wherein the one or more collections of vectors are formed by a Convolutional Neural Network (CNN) pre-trained on ImageNet to perform image analysis and classification of the images, and wherein the vectors in the one or more collections of vectors having similar patterns are grouped to form clusters, in accordance with one of k-means, EM clustering, and affinity propagation algorithms, and a size of the cluster is adjusted dynamically to produce a pre-determined number of clusters.

13. A system of real-time reverse image searching for one or more images analogous to a representative frame having one or more patterns, the system comprising:

a computing device connected to the network, the computing device is configured to:

capture in real time one or more images; and identify at least one of the captured one or more images as the representative frame for use as input in the reverse search;

a processor connected to a network and having access to at least one digital library warehousing a plurality of vectors and respective images and videos associated with each of the plurality of vectors, the processor is configured to:

calculate one or more mathematical representations for each of the one or more patterns in the representative frame to form a representative vector, the one or more mathematical representations corresponding to dimensions of the vector;

reduce a size of the vector by reducing a number of the dimensions to one of about 8% and a maximum trade-off between the quality of the image and the size of vector;

detect, in the at least one digital library, one or more of the plurality of vectors that are most similar to the vector of the representative frame; and offer, in real-time via the network, images and videos associated with the selected one or more of the plurality of vectors, wherein a number of the offered images and videos is pre-determined.

14. The system of claim 13, wherein the computing device comprises at least one video camera and the capturing is selected from one of training the at least one video camera on an object of interest and/or uploading an image and a video.

15. The system of claim 14, wherein the captured one or more images are updated automatically in response to a change in a context of the representative frame.

16. The system of claim 13, wherein the representative frame comprises a plurality of representative frames and at least one of the plurality of representative frames is one of a pre-selected representative frame and a representative frame selected in real-time.

17. The system of claim 13, wherein to identify the representative frame, the processor is further configured to:
select a first plurality of frames of the video;
calculate, for each frame, a number of pixels for each color value, the color value is selected from one of RGB, YUV, and LAB, wherein components of the color value are processed separately, and a score based on the color value of the components and a scaling based on the total number of pixels in the frame using a formula where score=log 2 (1.0+scaling×number of pixels); and
compare a sum of all scores in each frame to the sum of all scores of all of the first plurality of frames, wherein a frame of the first plurality of frames having a highest sum of all scores is selected as the representative frame.

18. The system of claim 17, wherein to identify the representative frame the processor is further configured to:
receive the at least one of the captured one or more images as still images and/or video, the captured one or more images are selected from 2-dimensional images and 3-dimensional images; and
edit the representative frame by removing portions of the one or more patterns from, and/or adding one or more patterns to the representative frame;
identify one or more attributes of images corresponding to the detected one or more of the plurality of vectors, wherein the attributes are selected from at least one of a size, a degree of similarity to the representative frame, color, a value, and a membership in a specific of the at least one digital library.

19. The system of claim 18, wherein to add the one or more patterns the processor is further configured to:
superimpose one or more additional patterns on to the representative frame, and
change any of a size, an angle, and a position of the superimposed one or more additional patterns in the edited representative frame.

20. The system of claim 13, further comprising the steps of:
cluster the plurality of vectors in the at least one digital library to form a first number of clusters; and
re-cluster the plurality of vectors to form a second number of clusters different from the first number, wherein the number of clusters is determined dynamically to correct an edge problem.

* * * * *